US009327749B2

(12) United States Patent
Young et al.

(10) Patent No.: US 9,327,749 B2
(45) Date of Patent: May 3, 2016

(54) FOLDABLE WAGON

(71) Applicant: Radio Flyer Inc., Chicago, IL (US)

(72) Inventors: Matthew E. Young, Chicago, IL (US);
Randall A. Sandlin, Chicago, IL (US);
Thomas K. Schlegel, Wheaton, IL (US);
Cameron Eckert, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/289,114

(22) Filed: May 28, 2014

(65) Prior Publication Data

US 2014/0353945 A1  Dec. 4, 2014

Related U.S. Application Data

(60) Provisional application No. 61/828,364, filed on May 29, 2013.

(51) Int. Cl.
B62B 3/02 (2006.01)
B62B 3/00 (2006.01)
B62B 5/08 (2006.01)
B62B 7/00 (2006.01)
B62B 7/08 (2006.01)

(52) U.S. Cl.
CPC . B62B 3/02 (2013.01); B62B 3/007 (2013.01); B62B 5/08 (2013.01); B62B 5/082 (2013.01); B62B 7/008 (2013.01); B62B 7/08 (2013.01)

(58) Field of Classification Search
CPC ........ B62B 7/08; B62B 7/008; B62B 2205/20
USPC .................................. 280/638, 35, 639, 659
See application file for complete search history.

(56) References Cited

U.S. PATENT DOCUMENTS

| 1,371,198 | A | | 3/1921 | Daum |
| 1,465,211 | A | | 8/1923 | Dunkelberger |
| 1,489,443 | A | | 4/1924 | Kelly |
| 1,771,813 | A | | 7/1930 | Norman |
| 1,820,466 | A | | 8/1931 | Lieblein |
| 2,020,766 | A | | 11/1935 | Brown |
| 2,471,553 | A | | 5/1949 | Zuckerman |
| 2,563,995 | A | | 8/1951 | East |
| 2,575,189 | A | | 11/1951 | Schmidt |
| 2,984,514 | A | | 5/1961 | Lemley |
| 2,989,318 | A | * | 6/1961 | Schenkman ................. 280/643 |
| 3,116,935 | A | | 1/1964 | Mitchin et al. |
| 3,162,460 | A | | 12/1964 | Davidson |
| 4,227,709 | A | | 10/1980 | Gradwohl et al. |
| 4,449,322 | A | | 5/1984 | Blumenthal |
| 4,706,986 | A | | 11/1987 | Kassai |
| 4,735,426 | A | | 4/1988 | McConnell |
| 4,741,552 | A | | 5/1988 | Kassai |
| 4,746,140 | A | | 5/1988 | Kassai |

(Continued)

Primary Examiner — Bryan Evans
(74) Attorney, Agent, or Firm — McDermott Will & Emery LLP

(57) ABSTRACT

A foldable wagon is provided having a collapsible frame that converts the wagon from a use configuration to a folded configuration for storage and transportation. The foldable wagon has a collapsible frame positonable in an open position and a collapsed position, a plurality of wheels coupled to the collapsible frame, a plurality of substantially rigid seats pivotally coupled to the collapsible frame, and a flexible housing about the collapsible frame to form a sidewall for the wagon. The substantially rigid seats each having a substantially rigid seat back and a substantially rigid seat bottom hingedly coupled to the seat back.

20 Claims, 29 Drawing Sheets

(56) References Cited

U.S. PATENT DOCUMENTS

| | | |
|---|---|---|
| 4,763,907 A | 8/1988 | Raymond |
| 4,796,909 A | 1/1989 | Kirkendall |
| 4,811,968 A | 3/1989 | Bolden |
| 4,824,137 A | 4/1989 | Bolden |
| 4,856,810 A | 8/1989 | Smith |
| 4,878,682 A | 11/1989 | Lee |
| 4,887,836 A | 12/1989 | Simjian |
| 5,050,900 A | 9/1991 | Lee |
| 5,333,893 A | 8/1994 | Chen |
| 5,360,222 A | 11/1994 | Bro et al. |
| 5,423,592 A | 6/1995 | Spurrier et al. |
| 5,538,267 A | 7/1996 | Pasin et al. |
| 5,669,617 A | 9/1997 | Pasin et al. |
| 5,833,251 A | 11/1998 | Peck |
| 5,857,695 A | 1/1999 | Crowell |
| 5,876,049 A | 3/1999 | Spear et al. |
| 5,911,432 A | 6/1999 | Song |
| 5,915,723 A | 6/1999 | Austin |
| 5,947,493 A | 9/1999 | Pasin et al. |
| 5,957,482 A | 9/1999 | Shorter |
| 6,010,145 A | 1/2000 | Liu |
| 6,079,720 A | 6/2000 | Spear et al. |
| 6,079,777 A | 6/2000 | Simmons et al. |
| 6,142,491 A | 11/2000 | Darling, III |
| 6,164,671 A | 12/2000 | Darling, III |
| 6,220,611 B1 | 4/2001 | Shapiro |
| 6,270,092 B2 | 8/2001 | Darling, III |
| 6,318,740 B1 | 11/2001 | Nappo |
| D458,648 S | 6/2002 | Chiappetta et al. |
| 6,488,293 B1 | 12/2002 | Mitchell et al. |
| 6,491,318 B1 | 12/2002 | Galt et al. |
| 6,499,750 B1 | 12/2002 | Michelau |
| 6,536,796 B1 | 3/2003 | Solomon |
| 6,561,529 B2 | 5/2003 | Darling, III |
| 6,581,945 B1 | 6/2003 | Shapiro |
| D483,419 S | 12/2003 | Chiappetta et al. |
| 6,733,026 B1 | 5/2004 | Robberson et al. |
| 6,845,991 B1 | 1/2005 | Ritucci et al. |
| 6,893,030 B2 | 5/2005 | Shapiro |
| 6,916,028 B2 | 7/2005 | Shapiro |
| 6,932,365 B2 | 8/2005 | Chiappetta et al. |
| 7,017,939 B2 | 3/2006 | Darling, III |
| 7,066,485 B2 | 6/2006 | Shapiro |
| 7,097,182 B1 | 8/2006 | Liu |
| 7,118,115 B2 | 10/2006 | Abel |
| 7,150,465 B2 | 12/2006 | Darling, III |
| 7,226,059 B1 | 6/2007 | Samuels |
| D547,812 S | 7/2007 | Seckel et al. |
| D566,200 S | 4/2008 | Seckel et al. |
| D570,424 S | 6/2008 | Blair |
| D573,663 S | 7/2008 | Ogawa |
| 7,392,994 B2 | 7/2008 | Darling, III |
| 7,407,177 B2 | 8/2008 | Darling, III |
| 7,461,857 B2 | 12/2008 | Darling, III |
| 7,475,900 B2 | 1/2009 | Cheng |
| 7,487,977 B2 | 2/2009 | Johnson |
| 7,523,955 B2 † | 4/2009 | Blair |
| 7,547,037 B2 | 6/2009 | Poppinga et al. |
| 7,562,897 B1 | 7/2009 | Sherman et al. |
| 7,703,795 B2 | 4/2010 | Williamson |
| 7,731,221 B2 | 6/2010 | Bess |
| 7,775,530 B2 | 8/2010 | Darling, III |
| 7,823,906 B2 | 11/2010 | Darling, III |
| 8,011,686 B2 | 9/2011 | Chen et al. |
| 8,091,916 B2 | 1/2012 | Shapiro |
| 8,191,907 B2 | 6/2012 | Watson |
| 8,220,824 B2 | 7/2012 | Chen et al. |
| 8,297,642 B2 | 10/2012 | Tyson, III |
| 8,388,015 B2 | 3/2013 | Chen |
| 8,851,503 B2 | 10/2014 | Tyson, III |
| 8,944,459 B1 | 2/2015 | Hagy |
| 8,955,855 B2 | 2/2015 | Herlitz et al. |
| D723,762 S | 3/2015 | Treadwell |
| 8,973,940 B2 | 3/2015 | Chen et al. |
| 9,033,361 B2 | 5/2015 | Frankel et al. |
| 9,108,656 B1 | 8/2015 | Nolan et al. |
| 9,242,663 B1 | 1/2016 | Nolan et al. |
| 2003/0025301 A1 | 2/2003 | Banuelos, III |
| 2004/0164512 A1 | 8/2004 | Gunter et al. |
| 2006/0119056 A1 | 6/2006 | Olsen |
| 2007/0284900 A1 | 12/2007 | Sze |
| 2009/0066114 A1 | 3/2009 | Molton |
| 2010/0140902 A1 | 6/2010 | Zehfuss |
| 2010/0156069 A1* | 6/2010 | Chen .................... 280/639 |
| 2011/0204598 A1 | 8/2011 | Stevenson |
| 2012/0235372 A1* | 9/2012 | Herlitz et al. ............ 280/47.38 |
| 2012/0274052 A1 | 11/2012 | Zhu |
| 2012/0292952 A1 | 11/2012 | Tyson, III |
| 2014/0353945 A1 | 12/2014 | Young et al. |
| 2015/0084298 A1 | 3/2015 | Herlitz et al. |

\* cited by examiner

† cited by third party

FOLDABLE WAGON

CROSS-REFERENCE TO RELATED APPLICATIONS

This application claims priority to U.S. Provisional Patent Application No. 61/828,364, filed May 29, 2013, which is incorporated herein by reference in its entirety and made a part hereof.

FEDERALLY SPONSORED RESEARCH OR DEVELOPMENT

Not Applicable.

TECHNICAL FIELD

The present disclosure relates generally to wagons, and more specifically to a foldable wagon that converts from a use configuration to a folded storage configuration.

BACKGROUND

Wagons, including folding wagons, are well known in the art. While such wagons according to the prior art provide a number of advantages, they nevertheless have certain limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a foldable wagon that is convertible from an open position to a closed or collapsed position. In one embodiment the foldable wagon has a collapsible frame, a plurality of wheels, a seat and a flexible housing.

According to another embodiment, the foldable wagon comprises a collapsible frame having a pivotable first upper frame member and a pivotable second upper frame member, the first and second pivotable upper frame members defining an upper perimeter of the frame. The collapsible frame being positionable in an open position and in a collapsed position, and the pivotable first upper frame member located at a front portion of the wagon in the open position and the pivotable second upper frame member located at a rear portion of the wagon in the open position. A handle is operably coupled at the front portion of the collapsible frame. At least one front wheel and at least one rear wheel are operably coupled to the collapsible frame. A seat is also provided, wherein the seat has a seat back and a seat bottom, wherein the seat back is pivotally coupled to the collapsible frame, wherein the seat bottom is hingedly coupled to the seat back, and wherein the seat bottom is distinct from a bottom of the wagon.

According to another embodiment, a first lower frame member and a second lower frame member are provided. The first and second lower frame members being operatively pivotally coupled to the foot rest, and the foot rest being slidable coupled to the collapsible frame to move vertically to collapse the collapsible frame.

According to another embodiment, a pivot bracket is disclosed. The first upper frame member being pivotally coupled to the pivot bracket and the second upper frame member being pivotally coupled to the pivot bracket.

According to another embodiment, the foldable wagon has a first seat back pivotally coupled to the first upper frame member and a first seat bottom hingedly coupled to the first seat back, and a second seat back pivotally coupled to the second upper frame member and a second seat bottom hingedly coupled to the second seat back.

According to another embodiment, a foldable wagon is disclosed comprising: a collapsible frame positionable in an open position and a collapsed position, the collapsible frame having a first upper frame member pivotally coupled to a pivot bracket to form a front portion of the wagon, a second upper frame member pivotally coupled to the pivot bracket to form a rear portion of the wagon, and a vertical frame member coupled to the pivot bracket; a first seat pivotally coupled to the collapsible frame and a second seat pivotally coupled to the collapsible frame, the first seat having a first seat back and a first seat bottom hingedly coupled to the first seat back, and the second seat having a second seat back and a second seat bottom hingedly coupled to the second seat back; and, a foot rest slideably coupled to the vertical frame member of the collapsible frame and moveable from a bottom of the wagon toward the pivot bracket to transition the collapsible frame to the collapsed position.

According to another embodiment, a foldable wagon has a first lower frame member and a second lower frame member, the first and second lower frame members operably pivotally coupled at their proximal ends to the foot rest to transition with the foot rest. The foldable wagon also has a first side frame member pivotally coupled at one end to the pivot bracket and at the other end operably coupled to the first lower frame member, and a second side frame member pivotally coupled at one end to the pivot bracket and at the other end operably coupled to the second lower frame member. The first and second side frame members operably join the first and second upper frame members to the first and second lower frame members, respectively. Additionally, a first link member is pivotally coupled at one end to the first upper frame member and at another end pivotally coupled to the first side frame member, and a second link member is pivotally coupled at one end to the second upper frame member and at another end pivotally coupled to the second side frame member.

According to another embodiment, a foldable wagon is disclosed comprising: a collapsible frame positonable in an open position and a collapsed position; a plurality of wheels coupled to the collapsible frame; a plurality of substantially rigid seats pivotally coupled to the collapsible frame, the substantially rigid seats each having a substantially rigid seat back and a substantially rigid seat bottom hingedly coupled to the seat back; and, a flexible housing about the collapsible frame to form a sidewall for the wagon.

According to another embodiment the collapsible frame comprises an upper frame member, a lower frame member and a side frame member between the upper frame member and the lower frame member, the seat back being pivotally coupled to the upper frame member, the seat bottom being pivotally coupled to the side frame member, and the seat back being hingedly coupled to the seat bottom.

According to another embodiment, a foot rest is slideably coupled to the collapsible frame. The foot rest is moveable vertically upwardly toward the upper frame member.

According to another embodiment, a foldable wagon is disclosed comprising: a collapsible frame positionable in an open position and a collapsed position; a plurality of wheels coupled to the collapsible frame; a handle coupled to the collapsible frame; and, wherein the collapsible frame comprises an upper frame member, a lower frame member, a side frame member between the upper frame member and the lower frame member, and a link member pivotally connecting the upper frame member and the side frame member, the collapsible frame being locked in the collapsed position when a pivot joining the link member to the upper frame member goes over center of a centerline to lock the upper frame member.

According to another embodiment, a method for folding a collapsible wagon is disclosed, comprising the steps of: providing a collapsible frame having a first upper frame member and a second upper frame member pivotally coupled to a pivot bracket, a seat pivotally coupled to the collapsible frame, a foot rest adjacent a bottom of the collapsible frame, and first and second lower frame members operatively pivotally coupled to the foot rest at proximal ends thereof; and, lifting the foot rest toward the pivot bracket, the proximal ends of the first and second lower frame members raising with the foot rest and distal ends of the first and second upper frame members pivotally dropping downward and inwardly toward distal ends of the first and second lower frame members, respectively.

According to yet another embodiment, the method for folding a collapsible wagon further comprises the steps of providing a first link member pivotally coupled at a first end to the first upper frame member and at a second end operatively pivotally coupled to the first lower frame member, and a second link member pivotally coupled at a first end to the second upper frame member and at a second end operatively pivotally coupled to the second lower frame member; and, pushing the distal end of first upper frame member inwardly such that the pivot connection of the first upper frame member to the first link member is inward of a centerline of two other pivot points, thereby locking the first upper frame member in an over the center locking position, and pushing the distal end of the second upper frame member inwardly such that the pivot connection of the second upper frame member to the second link member is inward of a centerline of two other pivot points, thereby locking the second upper frame member in an over the center locking position.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
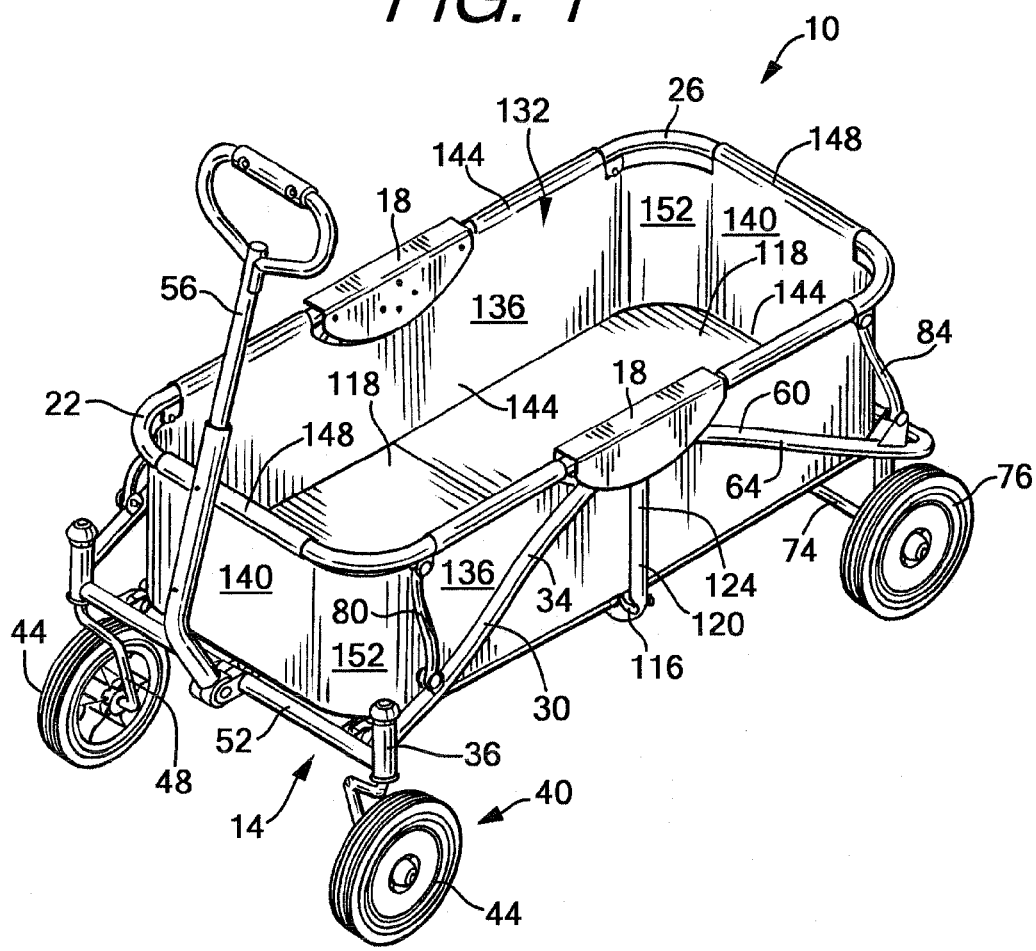
FIG. 1 is a perspective view of a foldable wagon according to one embodiment, showing the foldable wagon in an unfolded or use configuration.
Figure 2:
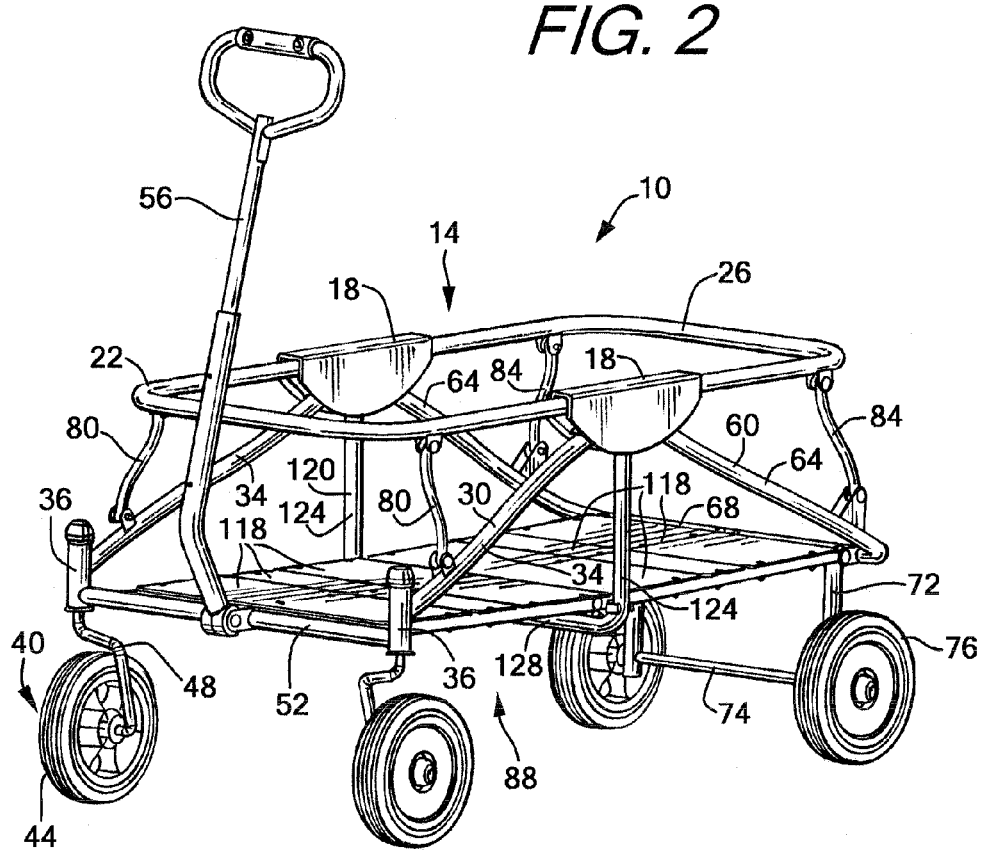
FIG. 2 is a perspective view of the foldable wagon of FIG. 1 with a housing assembly removed to reveal additional frame structure.
Figure 3:
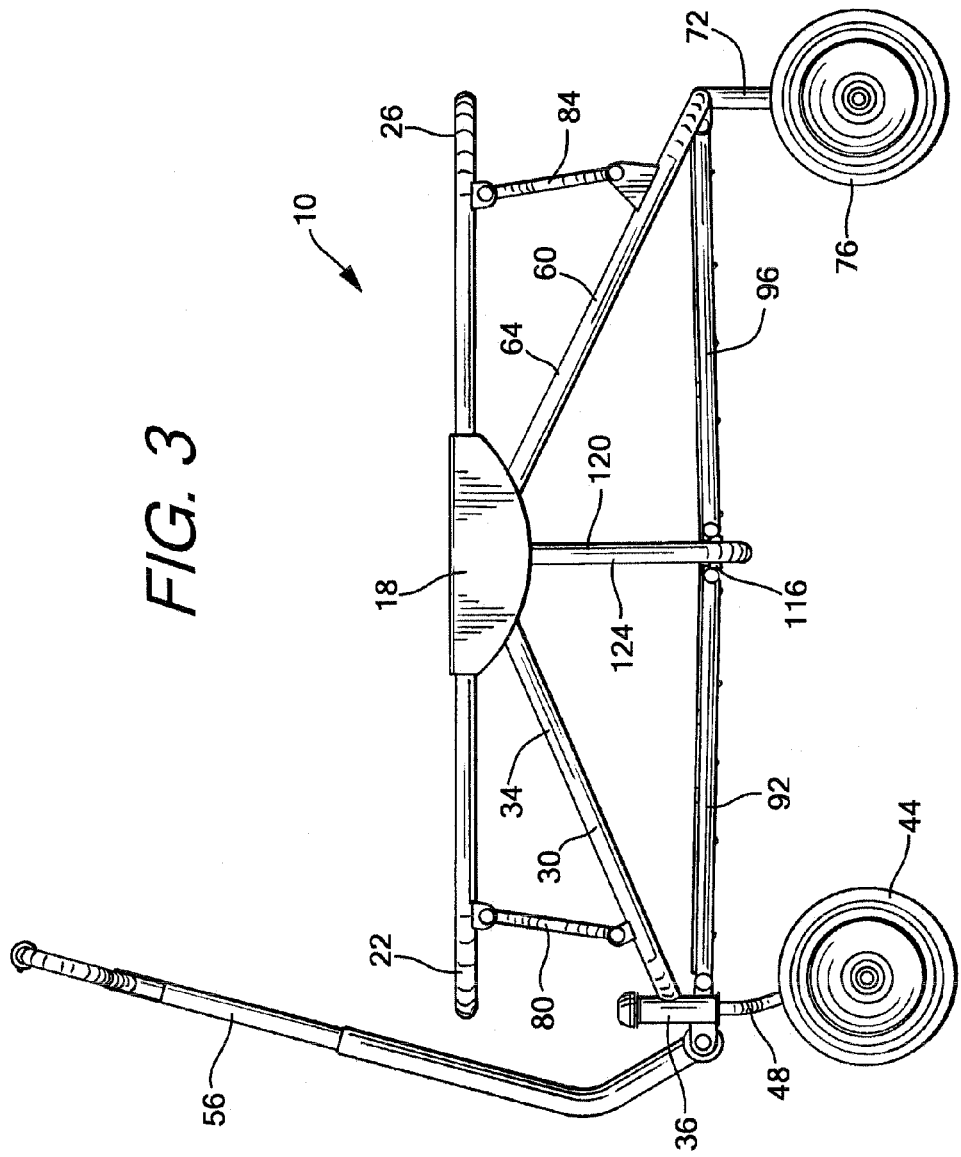
FIG. 3 is a side view of the foldable wagon of FIG. 1 with the housing assembly removed.

While the foldable wagon discussed herein is susceptible of embodiments in many different forms, there is shown in the drawings, and will herein be described in detail, preferred embodiments with the understanding that the present description is to be considered as an exemplification of the principles of the foldable wagon and are not intended to limit the broad aspects of the disclosure to the embodiments illustrated.

Figure 9:
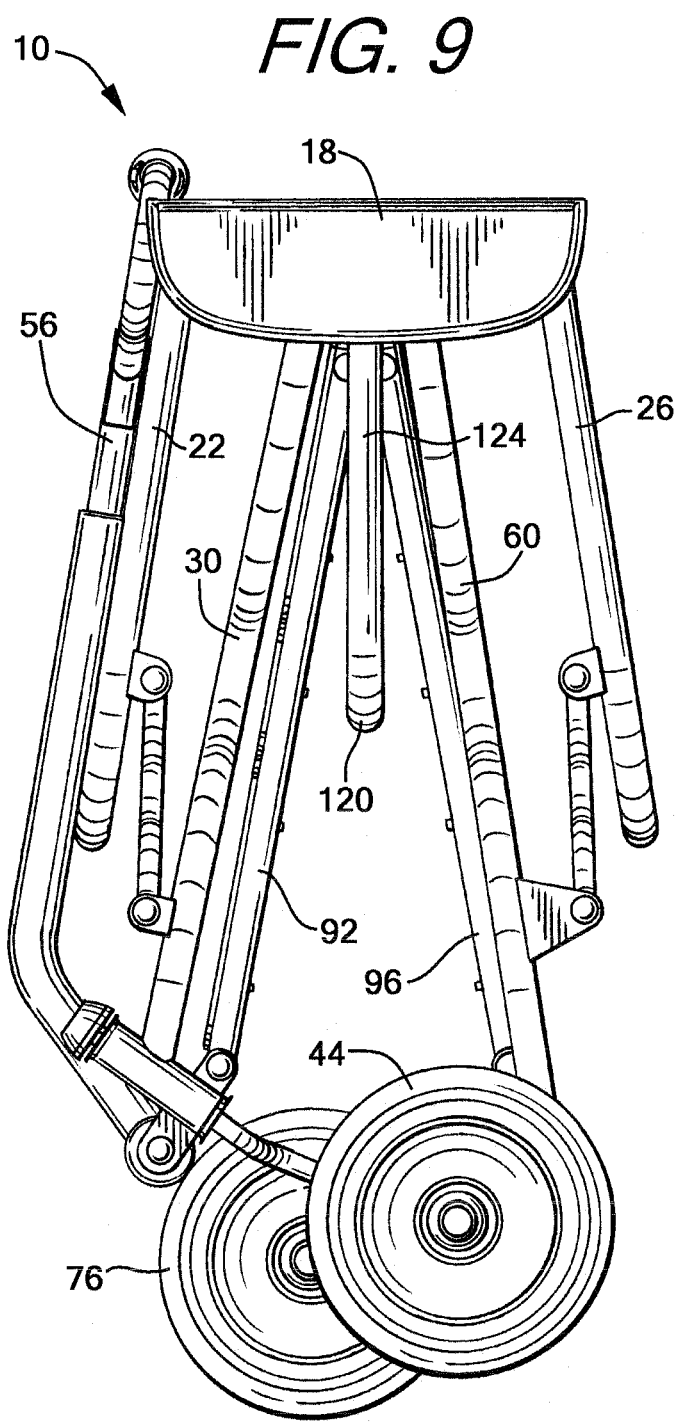
FIG. 9 is a side view of the foldable wagon of FIG. 1 with the housing assembly removed and showing the foldable wagon in a folded configuration.

Referring now to the figures, and initially to FIGS. 1-5, in one embodiment a foldable wagon 10 includes a collapsible frame assembly 14 that is moveable between an unfolded or use configuration (FIGS. 1-5) and a collapsed or folded configuration (FIG. 9). The frame assembly 14 includes a pair of laterally opposed pivot brackets 18. In various embodiments, other frame components are pivotally mounted to the pivot brackets 18. Each pivot bracket 18 has a generally U-shaped cross section. In one embodiment, a first upper frame 22 is coupled to and extends forwardly from the pivot brackets 18. The first upper frame 22 is pivotally coupled to the pivot brackets 18 with each end of the first upper frame 22 pivotally coupled to a respective one of the pivot brackets 18. A second upper frame 26, which may or may not be identically configured to the first upper frame 22, extends rearwardly from the pivot brackets 18. Each end of the second upper frame 26 is pivotally coupled to a respective one of the pivot brackets 18. When the wagon 10 is in the unfolded configuration, the first and second upper frames 22, 26 are positioned in a generally horizontal plane.

The frame assembly 14 also includes a first main frame 30 extending forwardly and downwardly from the pivot brackets 18. Although other configurations are possible, in the illustrated configuration the first main frame 30 includes a pair of longitudinally extending side members 34 pivotally coupled to the pivot brackets 18. A proximal end of each side member 34 is pivotally coupled to a respective one of the pivot brackets 18. As shown in the top and bottom views (FIGS. 4 and 5), side members 34 also extend laterally outwardly from the pivot brackets 18. A wheel support 36 is provided at the distal end of each side member 34. Each wheel support 36 is configured to pivotally support a front wheel assembly 40, which includes a front wheel 44 rotatably mounted upon an axle assembly 48 that is pivotally supported by the wheel support 36. The axle assemblies 48 are configured such that the front wheels 44 operate as casters to allow for steering of the wagon 10. In a preferred embodiment, the axle assemblies 48 for the front wheels 44 are comprised of single-sided bent wire caster. A front cross member 52 extends laterally between the two wheel supports 36, and a telescoping handle 56 is pivotally coupled to the front frame member.

Figure 4:
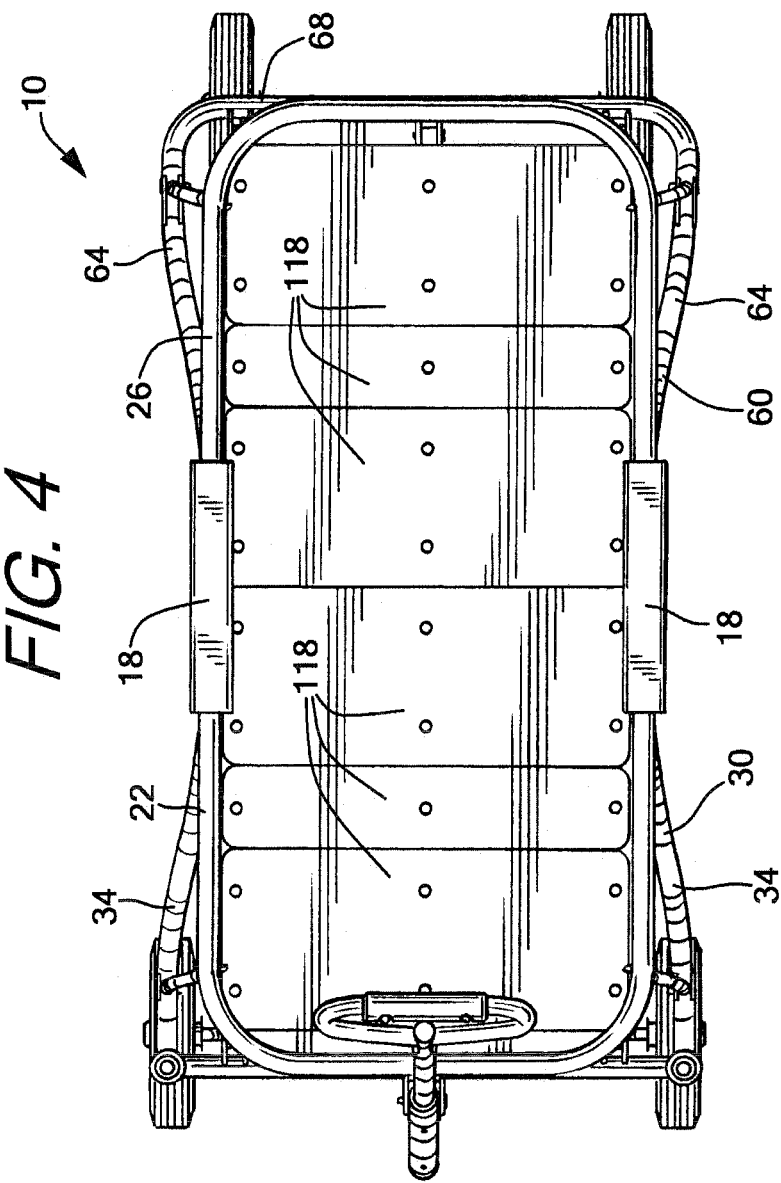
FIG. 4 is a top view of the foldable wagon of FIG. 1 with the housing assembly removed.
Figure 5:
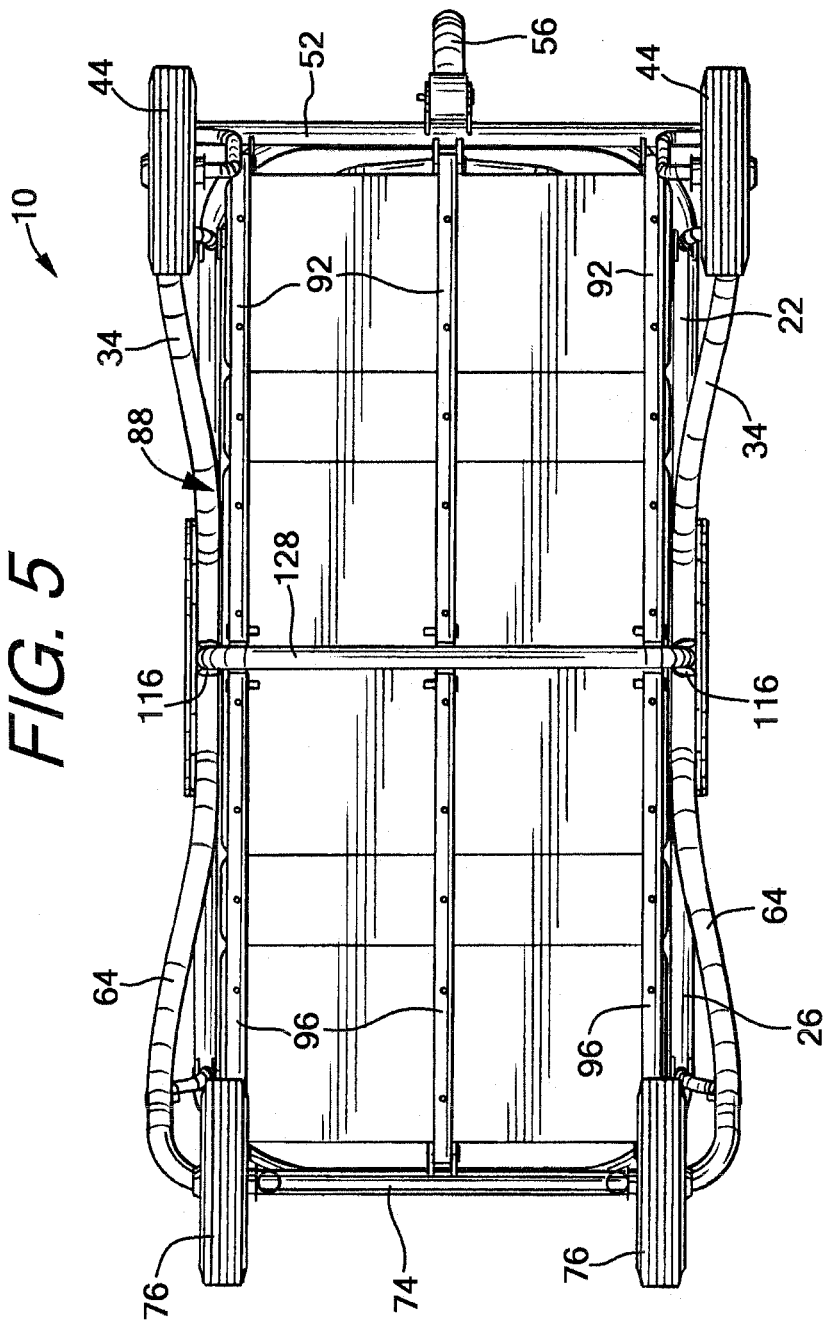
FIG. 5 is a bottom view of the foldable wagon of FIG. 1.

The frame assembly 14 also includes a second main frame 60 extending rearwardly and downwardly from the pivot brackets 18. In the illustrated configuration, the second main frame 60 is generally U-shaped and includes rearwardly and downwardly extending side members 64 and a laterally extending rear cross member 68. In this embodiment, each end of the second main frame 60 is pivotally coupled to a respective one of the pivot brackets 18. A pair of downwardly extending rear wheel supports 72 extend downwardly from the rear cross member 68. A rear axle 74 extends between and through the rear wheel supports 72 and rotatably supports a pair of rear wheels 76. As best shown in FIG. 4, the front wheels 44 are outboard of the rear wheels 76, thereby providing greater stability for the wagon 10. Additionally, because the front wheels 44 are outboard of the rear wheels 76, the rear wheels 76 can be connected to a solid rear axle 74 and still avoid the front wheels 44 during folding of the wagon 10.

The first upper frame 22 and the first main frame 30 are coupled together by a pair of first drive links 80, one on each side of the wagon 10. Each first drive link 80 has one end pivotally coupled to the first upper frame 22, and the opposite end pivotally coupled to the first main frame 30. In the embodiment of FIGS. 1-5, the first drive links 80 are coupled to the side members 34 of the first main frame 30. In other embodiments, such as the embodiments of FIGS. 10-13, the first drive links 80 are coupled to the front cross member 52 of the first main frame 30. Similarly, the second upper frame 26 and the second main frame 60 are coupled together by a pair of second drive links 84, one on each side of the wagon 10.

Each second drive link 84 has one end pivotally coupled to the second upper frame 26, and the opposite end pivotally coupled to the second main frame 60. Like the first drive links 80, the second drive links 84 can be coupled to the side members 64 of the second main frame 60 or to the rear cross member 68 of the second main frame 60. The first and second drive links 80, 84 couple the first and second upper frames 22, 26 to the respective first and second main frames 30, 60, thereby defining examples of first and second four bar linkages in which the pivot brackets 18 function as the "ground" link of the four bar linkages.

Figure 6:
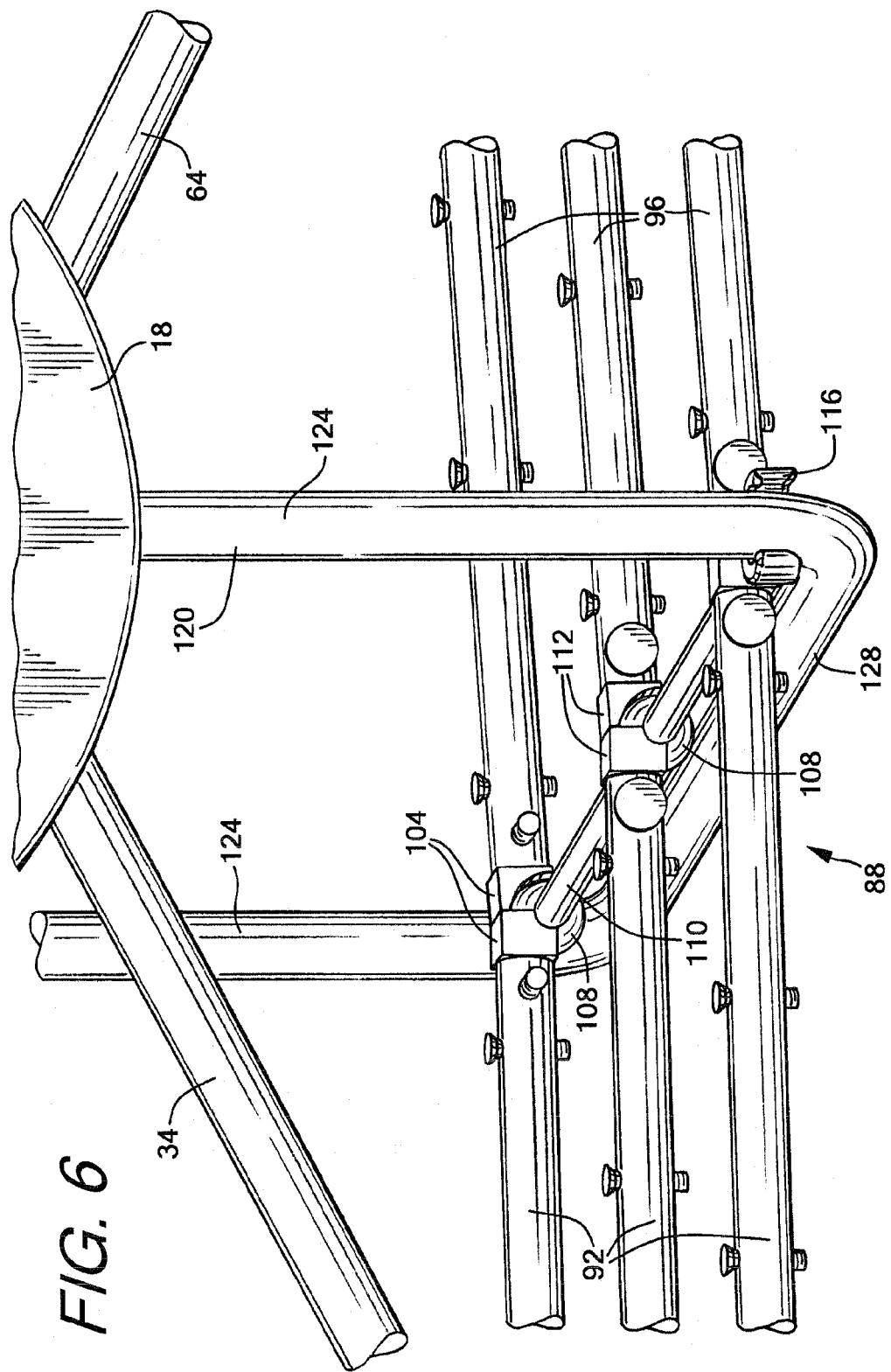
FIG. 6 is an enlarged perspective view of a central pivot area of the foldable wagon of FIG. 1.

Referring also to FIG. 6, the frame assembly 14 also includes a bottom frame 88 that extends between the front cross member 52 of the first main frame 30 and the rear cross member 68 of the second main frame 60. In the configuration of FIGS. 1-9, the bottom frame 88 includes a set of first bottom frame members 92 pivotally coupled to and extending rearwardly from the front cross member 52. The bottom frame 88 also includes a set of second bottom frame members 96 pivotally coupled to and extending forwardly from the rear cross member 68. The first and second bottom frame members 92, 96 extend toward the middle of the wagon 10 and are pivotally coupled to a central pivot bar 110. In one embodiment, the inner end of each of the first and second bottom frame members 92, 96 is provided with a bushing 104. The bushings 104 each include a generally circular portion 108 having an opening therein through which the central pivot bar 110 extends. The bushings 104 also include a generally rectangular portion 112 that abuts with the rectangular portion 112 of an opposed bushing 104 when the wagon 10 is in the unfolded configuration, thereby limiting downward movement of the central pivot bar 110 beyond the position shown in FIG. 6 in which the first and second bottom frame members 92, 96 are substantially co-planar. A guide yoke 116 is coupled to each end of the central pivot bar 110 for guiding movement of the central pivot bar 110 and the bottom frame 88 during folding and unfolding of the wagon 10, as discussed further below. Floor panels 118 are coupled to and movable with the first and second bottom frame members 92, 96 to define a floor of the wagon 10.

In one embodiment, the frame assembly 14 also includes a generally U-shaped hanging support bar 120 located substantially at the middle of the wagon 10. The hanging support bar 120 includes a pair of opposed vertical side members 124 that are each fixedly coupled to a respective one of the pivot brackets 18. A central cross member 128 extends between the vertical side members 124 and is located substantially directly below the central pivot bar 110 when the wagon 10 is in the unfolded configuration. The guide yokes 116 on each end of the central pivot bar 110 are engaged with a respective one of the vertical side members 124 and are configured to slide upwardly and downwardly along the vertical side members 124 during folding and unfolding of the wagon 10. In the configuration of FIGS. 1-9, the central cross member 128 assists the floor bushings 104 in limiting downward movement of the central pivot bar 110. Thus, in a preferred embodiment, when the wagon 10 is in the unfolded or use configuration, gravity and loads carried by the floor panels 118 operate to self-lock the wagon 10 and thus secure the wagon 10 in the use configuration without the use of latches, clamps, or other securement devices. However, while the wagon may be maintained in the use or unfolded configuration without the use of latches, clamps, or other securement devices, in alternate embodiments a securement device, such as a latch or clamp, may be utilized to maintain the wagon in the open position.

In one embodiment, the wagon 10 also includes a housing assembly 132 that defines sidewalls of the wagon 10. In a preferred embodiment, the housing assembly 132 is made of fabric and is referred to as the fabric assembly 132. As shown in FIG. 1, the housing assembly 132 includes side portions 136 and end portions 140. The housing assembly 132 also may include lower ends 144 that are coupled to the bottom frame 88 and/or the floor panels 118, and upper ends 148 that wrap around the first and second upper frames 22, 26. The lower ends 144 may be coupled between the bottom frame 88 and the floor panels 118, or may be attached directly to an upper surface of the floor panels 118. In some configurations, the housing assembly 132 may include a bottom panel that covers and substantially overlies the floor panels. The housing assembly 132 also includes corner portions 152 that extend between adjacent side and end portions 136, 140. The corner portions 152 may be attached at their lower ends to the bottom frame and/or the floor panels 118. Upper ends of the corner portions 152 are preferably not attached to the first and second upper frames 22, 26 to permit folding of the wagon.

Figure 7:
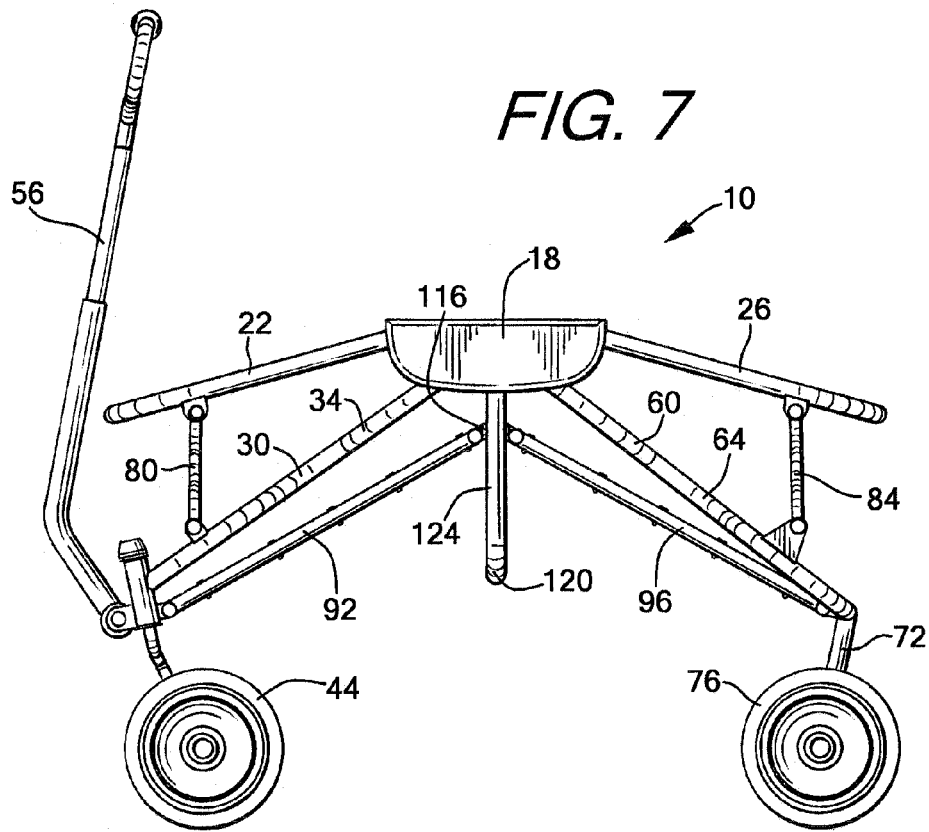
FIG. 7 is a side view of the foldable wagon of FIG. 1 with the housing assembly removed and showing the foldable wagon in a partially folded configuration.
Figure 8:
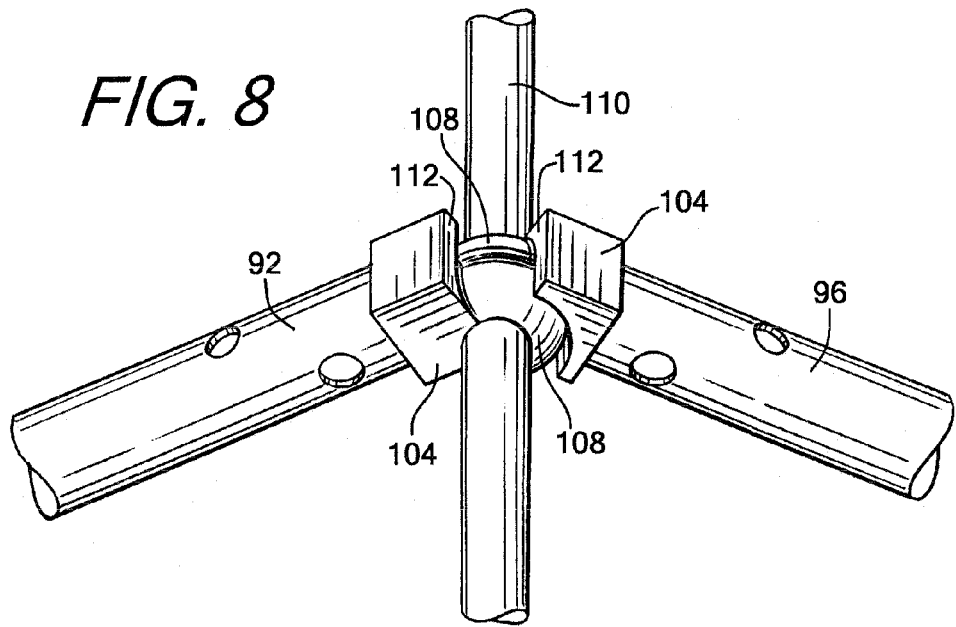
FIG. 8 is a perspective view of a central bushing assembly of the central pivot area of FIG. 6 in the partially folded configuration.

With reference to FIGS. 7-9, to fold the wagon the central pivot bar 110 is lifted in a generally vertical direction. To this end, a fabric handle or the like (not shown) may be attached to the central pivot bar 110 and may extend through one or more gaps or openings in the floor panels 118 for access by a user. As the central pivot bar 110 is lifted, the guide yokes 116 slide upwardly along the vertical side members 124 of the hanging support bar 120, and the first and second bottom frame members 92, 96 begin to pull the front and rear cross members 52, 68 inwardly toward the center of the wagon 10 (see FIG. 7). Also, as shown in FIG. 7, as the central pivot bar 110 is lifted, the rectangular portions 112 of the opposed bushings 104 separate from one another and the circular portions 108 of the bushings 104 allow the first and second bottom frame members 92, 96 to pivot about the central pivot bar 110. Further, as the wagon 10 is folded, the front wheels 44 move backwards and toward a center of the wagon 10. This movement causes the front caster 48 to rotate, thereby providing clearance for nesting of the rear wheels 76 in the folded configuration. It is also understood that, in the preferred embodiment, because the front axle assembly 48 is a single-sided bent wire caster, gravity will similarly cause the front axle assembly 48 to rotate to the appropriate position due to the weight of the front wheel 44.

Inward movement of the front and rear cross members 52, 68, combined with the upward force on the central pivot bar 110, causes the first and second main frames 30, 60 and, by way of the first and second drive links 80, 84, the first and second upper frames 22, 26, to pivot generally inwardly and downwardly relative to the pivot brackets 18. When the central pivot bar 110 has been moved to a location between the pivot brackets 18, the wagon 10 is generally in the fully folded configuration of FIG. 9. The telescoping handle 56 may be reduced in length before or after the wagon 10 is folded. To unfold the wagon 10, a user may grasp the upper frames 22, 26 and pull them apart from one another, which tends to extend the wagon 10 in the longitudinal direction and causes the central pivot bar 110 to move downwardly along the vertical side members 124 of the hanging support bar 120. When the wagon reaches the unfolded configuration, the rectangular portions 112 of the opposed bushings 104 engage one another to limit further downward movement of the central pivot bar 110.

Figure 12:
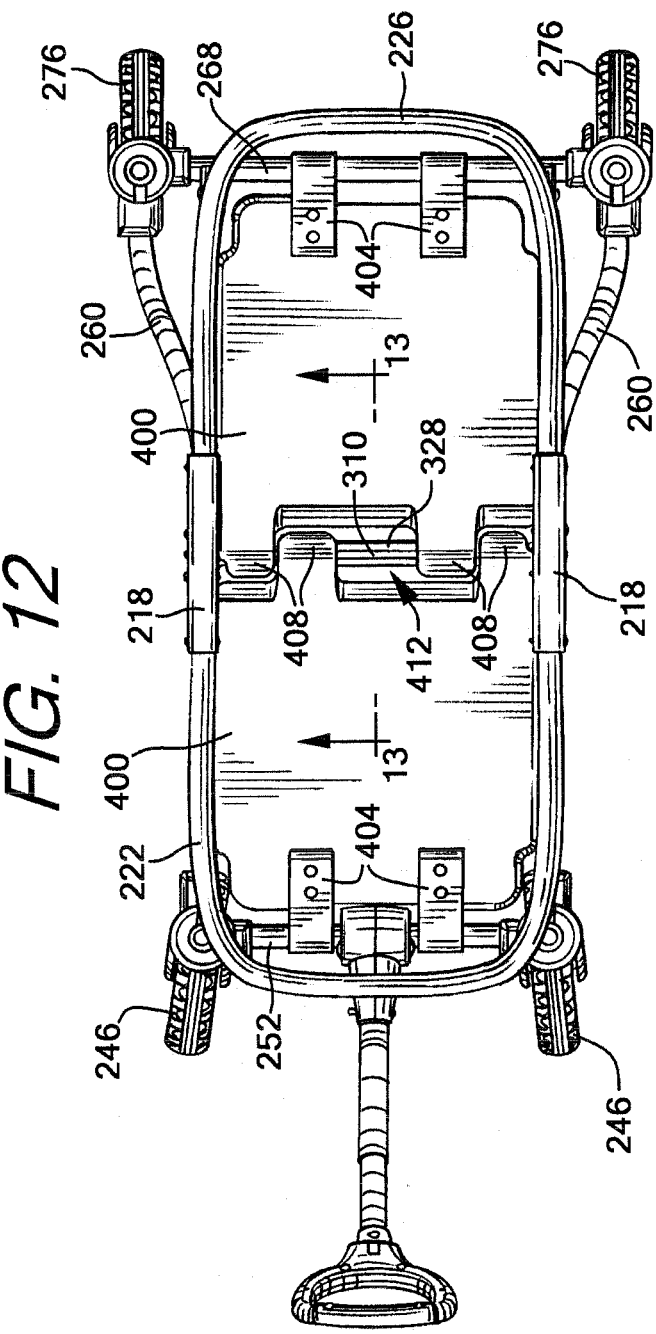
FIG. 12 is a top view of the foldable wagon of FIG. 10 with the housing assembly removed.

Referring now to FIGS. 10-13, another embodiment of the foldable wagon 210 is shown. Among other things, this embodiment includes a pair of molded seat panels 400 in place of the bottom frame 88 and floor panels 118 of the embodiment shown in FIGS. 1-9. Components of the foldable wagon 210 that correspond to components of the foldable wagon 10 have been given the same reference number, increased by 200. Each seat panel 400 is pivotally coupled to its respective front cross member 252 and rear cross member 268 by seat brackets 404. The seat brackets 404 pivotally receive the respective front or rear cross member 252, 268 and are secured to, e.g., by fasteners, the respective seat panels 400. Each seat panel 400 is also pivotally coupled to the central pivot bar 310 by inwardly extending pivot extensions 408. As shown in FIG. 12, the pivot extensions 408 are configured to alternate or interlock with one another, while providing a central gap or opening 412 through which the central pivot bar 310 can be grasped for folding of the wagon 210. Alternatively, a handle (not shown) can be provided on the central pivot bar 310 and extended through the central gap or opening for folding of the wagon 210. In some embodiments the seat panels 400 may be formed by blow molding. In some embodiments, the seat panels 400 may also be substantially identical to one another.

Figure 13:
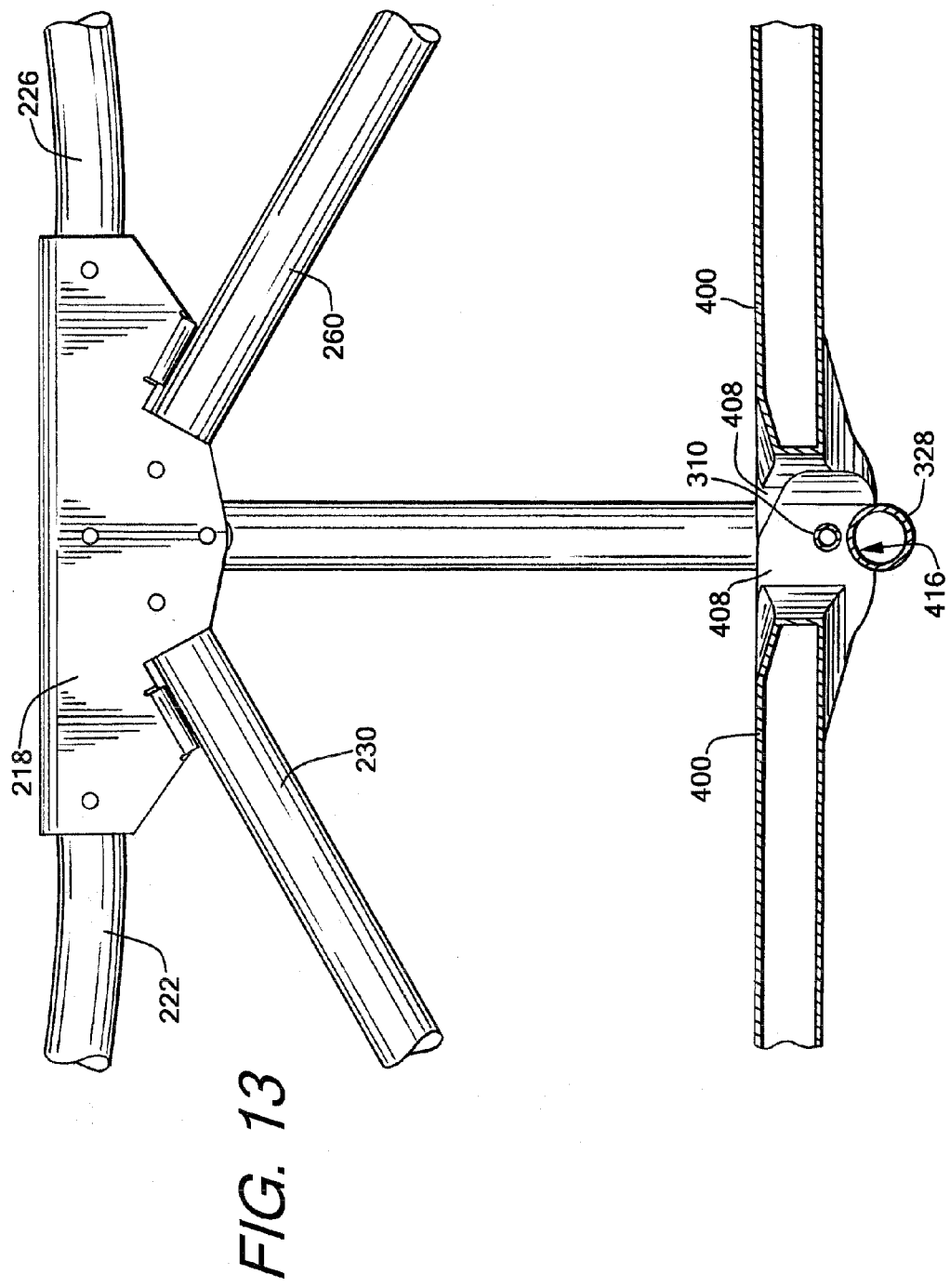
FIG. 13 is a section view taken along line 13-13 of FIG. 12.

As shown in FIG. 13, each pivot extension 408 includes a through opening that receives the central pivot bar 310. Each pivot extension 408 also includes a downwardly extending concave surface 416 configured for engagement with an upper surface of the central cross member 328. When the wagon 210 is in the unfolded configuration, engagement between the central cross member 328 and the concave surfaces 416 of the pivot extensions 408 limits downward movement of the central pivot bar 310 to maintain the wagon in the unfolded configuration. While the wagon may be maintained in the unfolded configuration without the use of latches, clamps, or other securement devices, in alternate embodiments a securement device, such as a latch or clamp, may be utilized to maintain the wagon in the open position. Folding of the wagon 210 proceeds in the same manner as that discussed above with respect to the wagon 10, i.e., by lifting upwardly on the central pivot bar 310, which causes the first and second main frames 230, 260 and, by way of the first and second drive links 280, 284, the first and second upper frames 222, 226, to pivot generally inwardly and downwardly relative to the pivot brackets 218. Although, as noted above, in the wagon 210 the first and second drive links 280, 284 extend between the first and second upper frames 222, 226 and the front and rear cross members 252, 268. As best shown in FIG. 12, while the first and second main frames 30, 60 of the wagon 10 both extend laterally outwardly, in the wagon 210, only the second main frame 260 extends laterally outwardly, thereby providing the rear wheels 276 with a slightly larger track than the front wheels 244.

Figure 10:
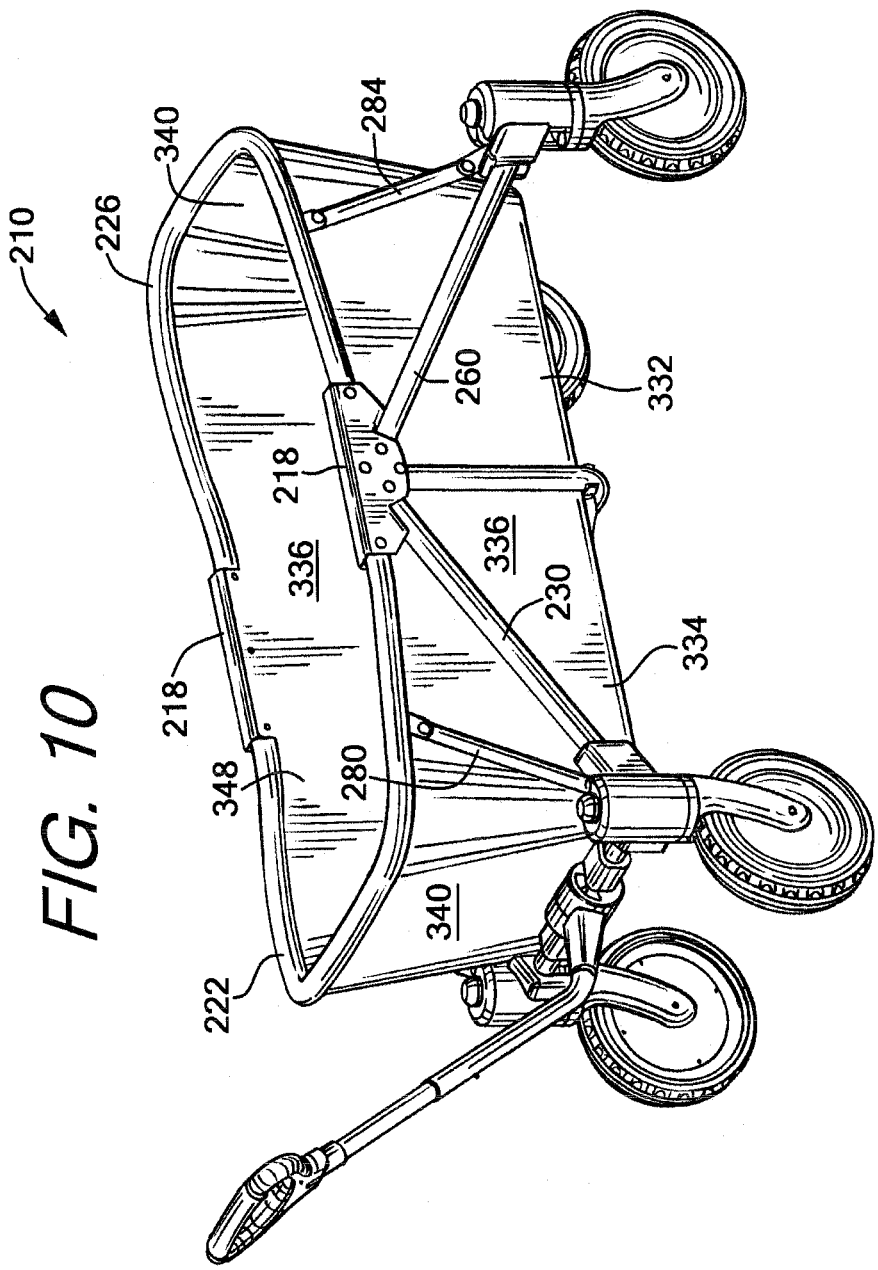
FIG. 10 is a perspective view of a foldable wagon according to another embodiment and having molded floor panels.
Figure 11:
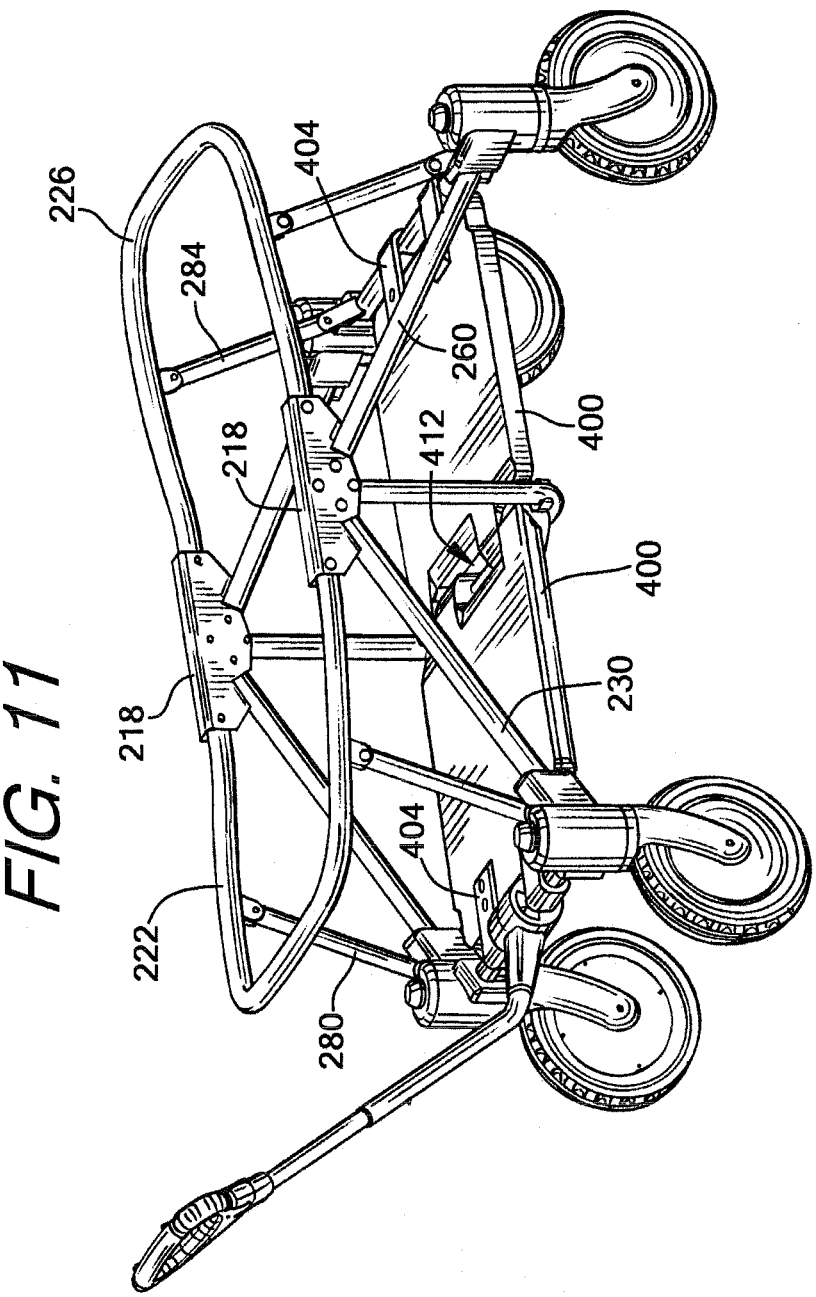
FIG. 11 is a perspective view of the foldable wagon of FIG. 10 with the housing assembly removed.

This embodiment of the wagon 210 also includes a housing assembly 332 that defines sidewalls of the wagon 210. As in the first embodiment, the housing assembly 332 may comprise a fabric assembly 332. As shown in FIG. 10, the housing assembly 332 includes side portions 336 and end portions 340 with lower ends 344 that are coupled to the seat panels 400, and upper ends 348 that are coupled to the first and second upper frames 222, 226. The housing assembly 332 also may include lower ends 344 that are coupled to the seat panels 400, and upper ends 348 that wrap around the first and second upper frames 222, 226. In some configurations, upper ends 348 of the fabric assembly 332 may be coupled to or may wrap around the pivot brackets 218.

Referring now to FIGS. 14-32, another embodiment of the foldable wagon 510 is shown. Among other things, in a preferred embodiment this embodiment includes a pair of foldable seats 500, preferably rigid foldable seats 500, in the interior of the wagon housing 632. In many instances, components of this embodiment of the foldable wagon 510 that correspond to components of the previously described foldable wagon 10 have been given the same reference number, increased by 500.

Figure 28:
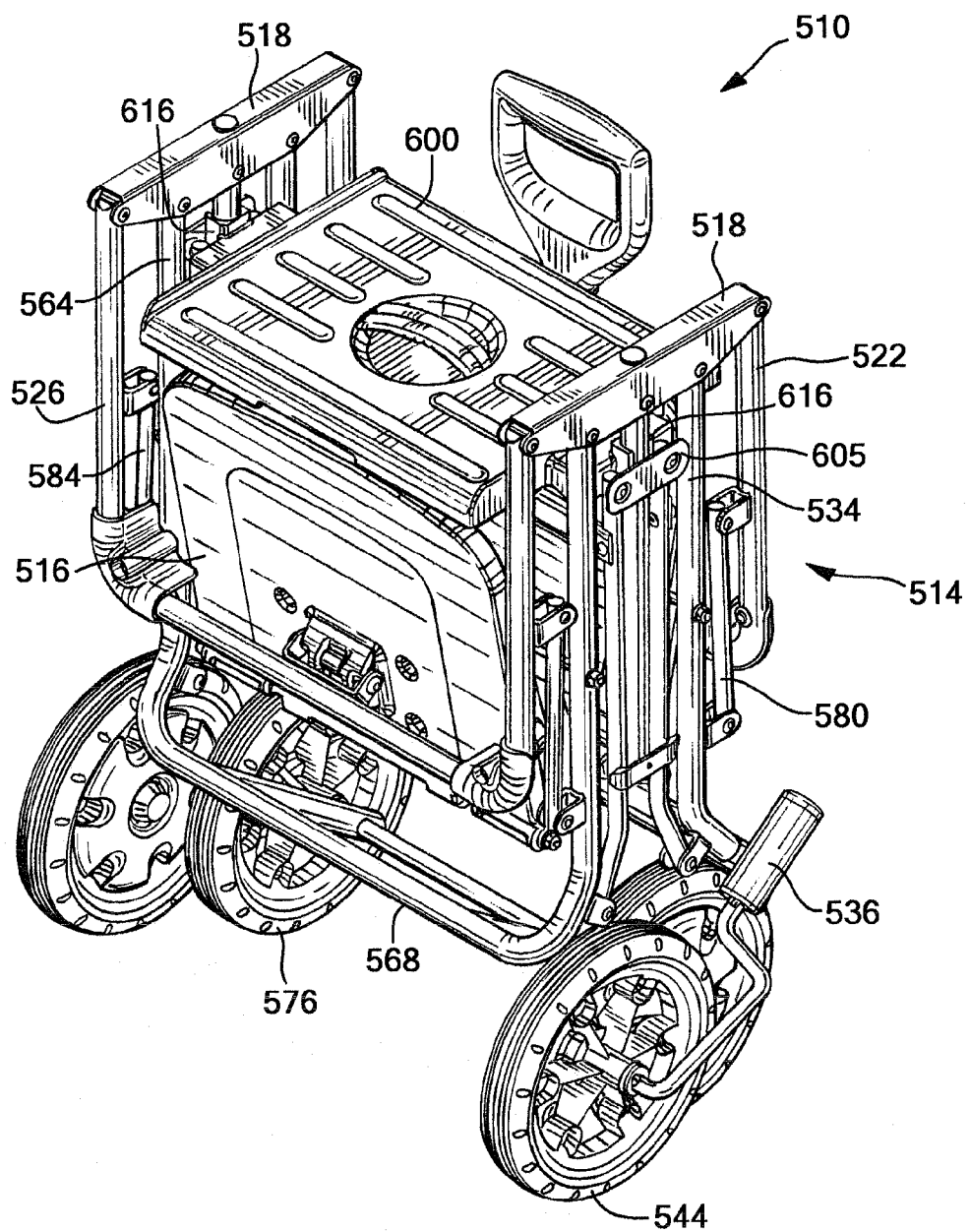
FIG. 28 is a perspective view of wagon of FIG. 17 in the folded position.
Figure 29:
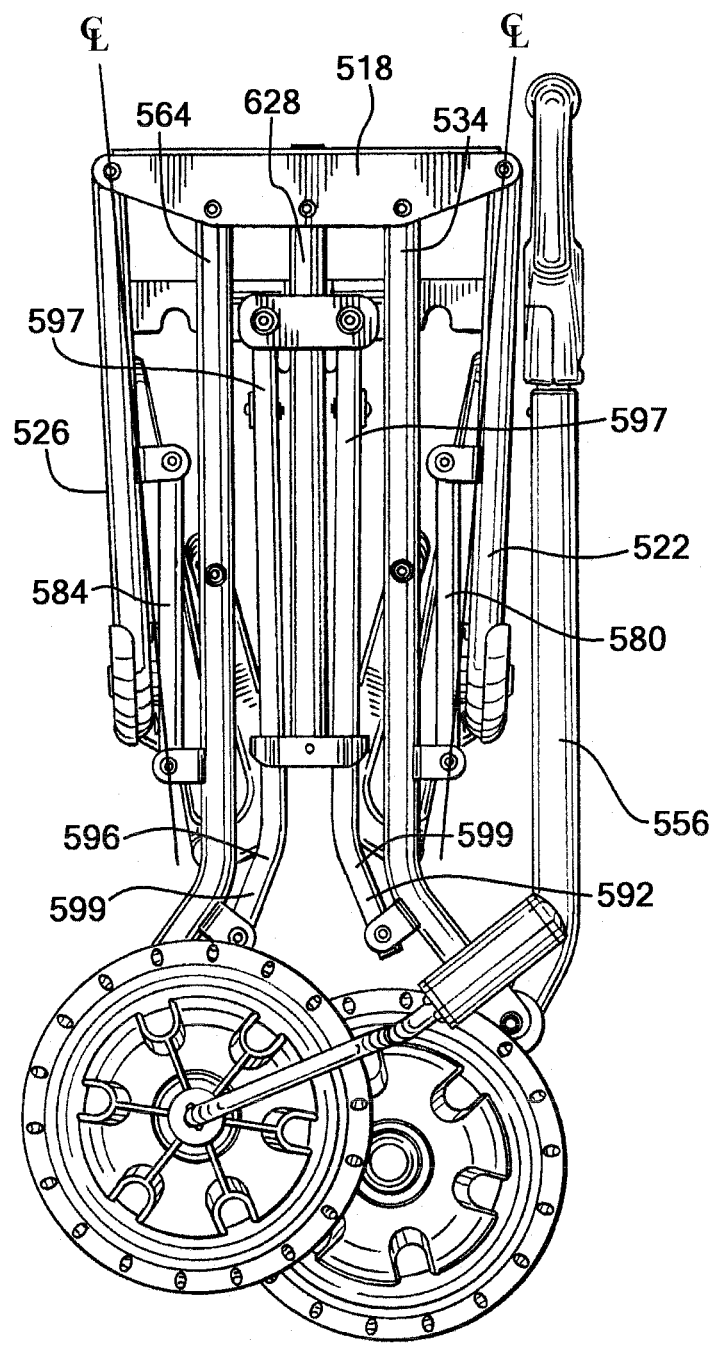
FIG. 29 is a side view of the wagon of FIG. 28.
Figure 30:
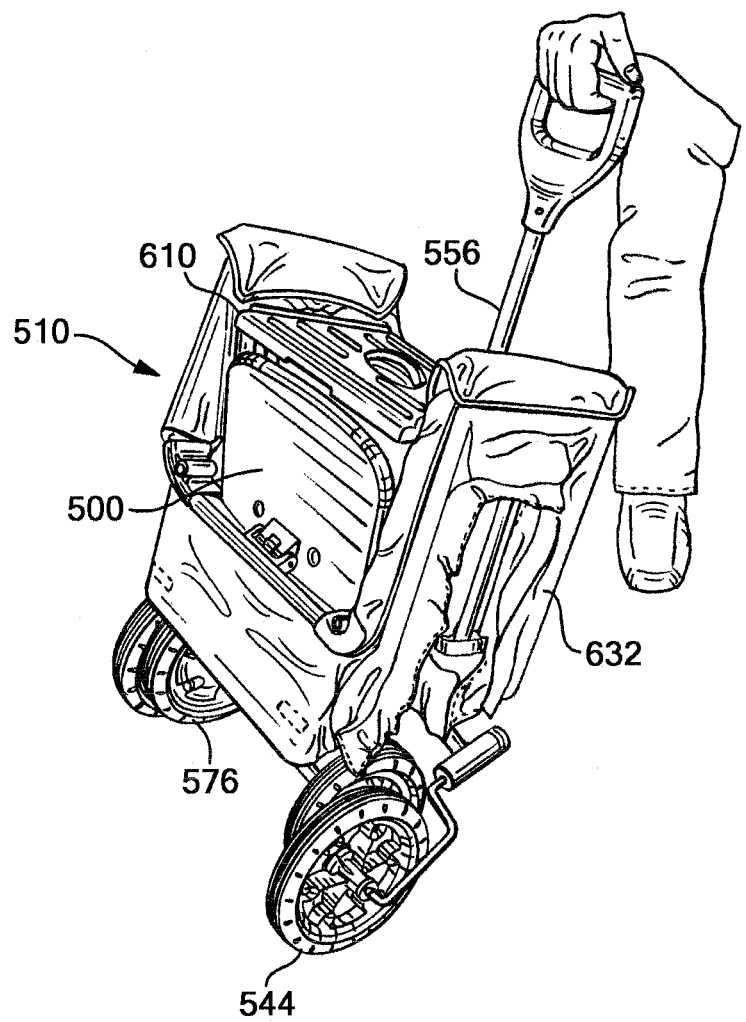
FIG. 30 is a perspective view of the wagon of FIG. 14 in the closed position for transport.

The foldable wagon 510 is shown with the housing 632 (FIGS. 14-16), and without the housing (FIGS. 17-21), to better disclose the collapsible frame assembly 514. Similar to a prior embodiment, in a preferred example of this embodiment the housing 632 is preferably made of a flexible material, such as fabric. The flexible housing 632 is preferably secured about a perimeter of the foldable wagon 510, either inside of the collapsible frame 514, outside the collapsible frame 514 or both inside and outside the collapsible frame 514. Unlike the prior embodiment, in a preferred example of this embodiment, substantially rigid foldable seats 500 are included in addition to the housing 632. Additionally, in this embodiment the collapsible frame 514 of the foldable wagon 510 is positionable and moveable between an open, unfolded or use configuration (FIGS. 14-21) and a collapsed or folded configuration (FIGS. 28-30).

Figure 17:
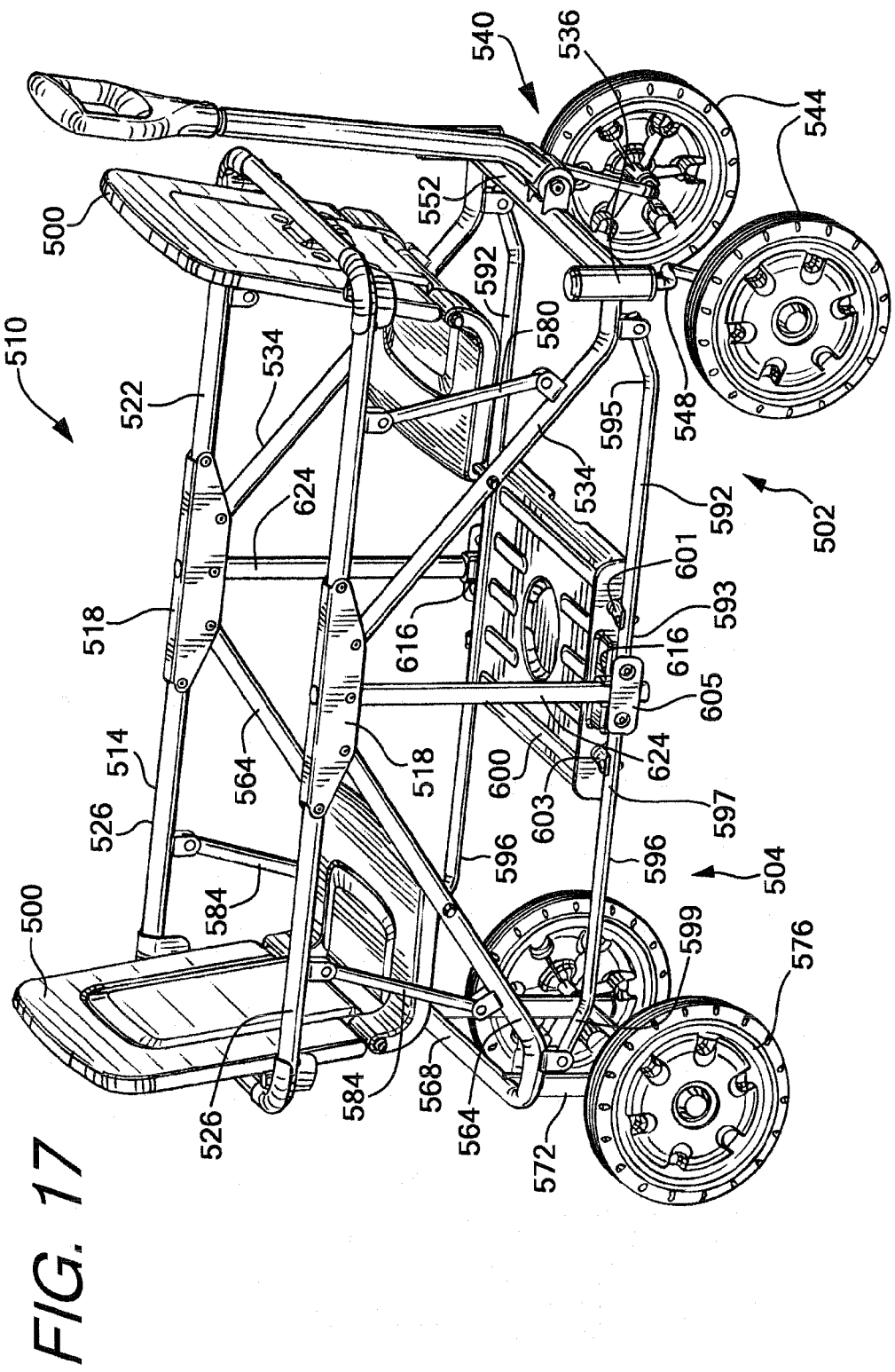
FIG. 17 is a perspective view of the wagon of FIG. 14 with the housing assembly partially removed.
Figure 18:
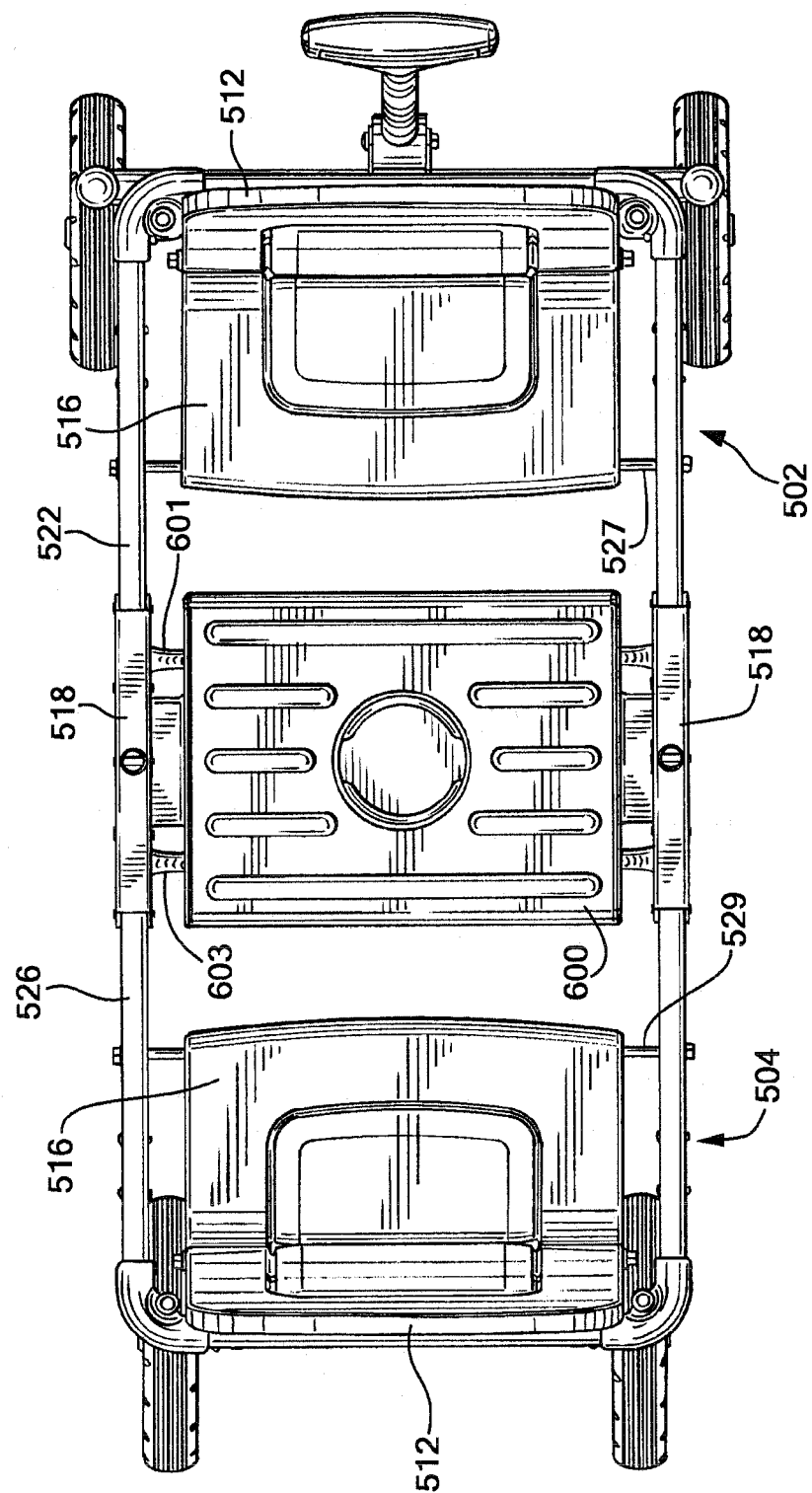
FIG. 18 is a top view of the wagon of FIG. 17.

In one embodiment, as best shown in FIG. 17, the collapsible frame assembly 514 includes a first upper frame member 522 and a second upper frame member 526. In a preferred embodiment, the first and second upper frame members 522, 526 are generally U-shaped tubular structures. The first and second upper frame members 522, 526 are pivotally connected to a pivot bracket 518. As shown in FIG. 17, two laterally opposed pivot brackets 518 are preferably utilized, one being provided at each side of the frame assembly 514 and preferably in the middle of the wagon 510. Each pivot bracket 518 may have a generally U-shaped cross section. In one embodiment, the first upper frame member 522 is coupled to and extends forwardly from the pivot brackets 518 and the second upper frame member 526 is coupled to and extends rearwardly from the same pivot brackets 518. Accordingly, in the open position the first upper frame member 522 is located at and extends toward a front portion 502 of the wagon 510, and the second upper frame member 526 is located at and extends toward a rear portion 504 of the wagon 510. When the wagon 510 is in the unfolded configuration, the first and second upper frame members 522, 526 are preferably positioned in a generally horizontal plane. The first and second pivotable upper frame members 522, 526 define an upper perimeter of the frame 514.

Figure 21:
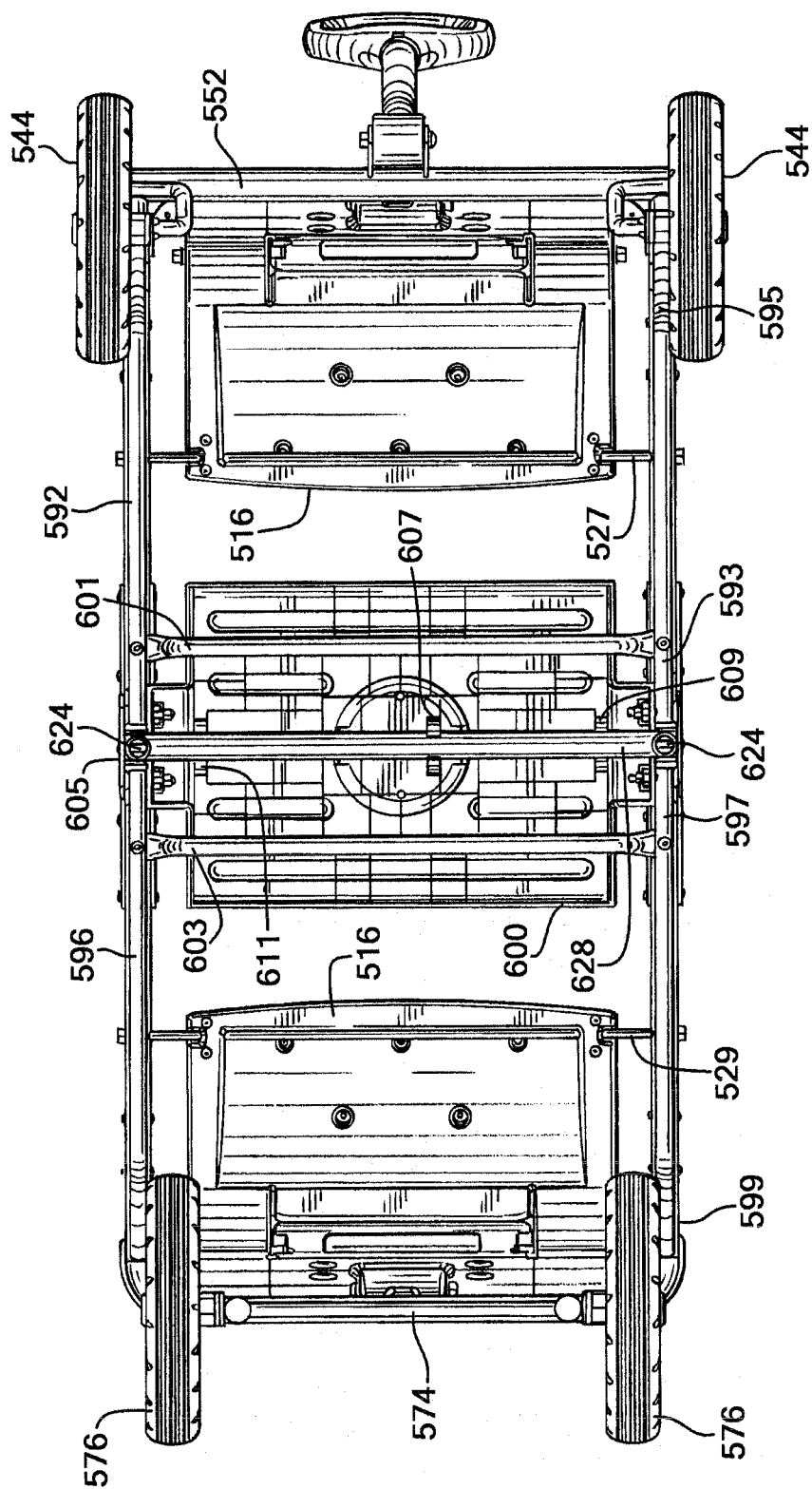
FIG. 21 is a bottom view of the wagon of FIG. 17.
Figure 22:
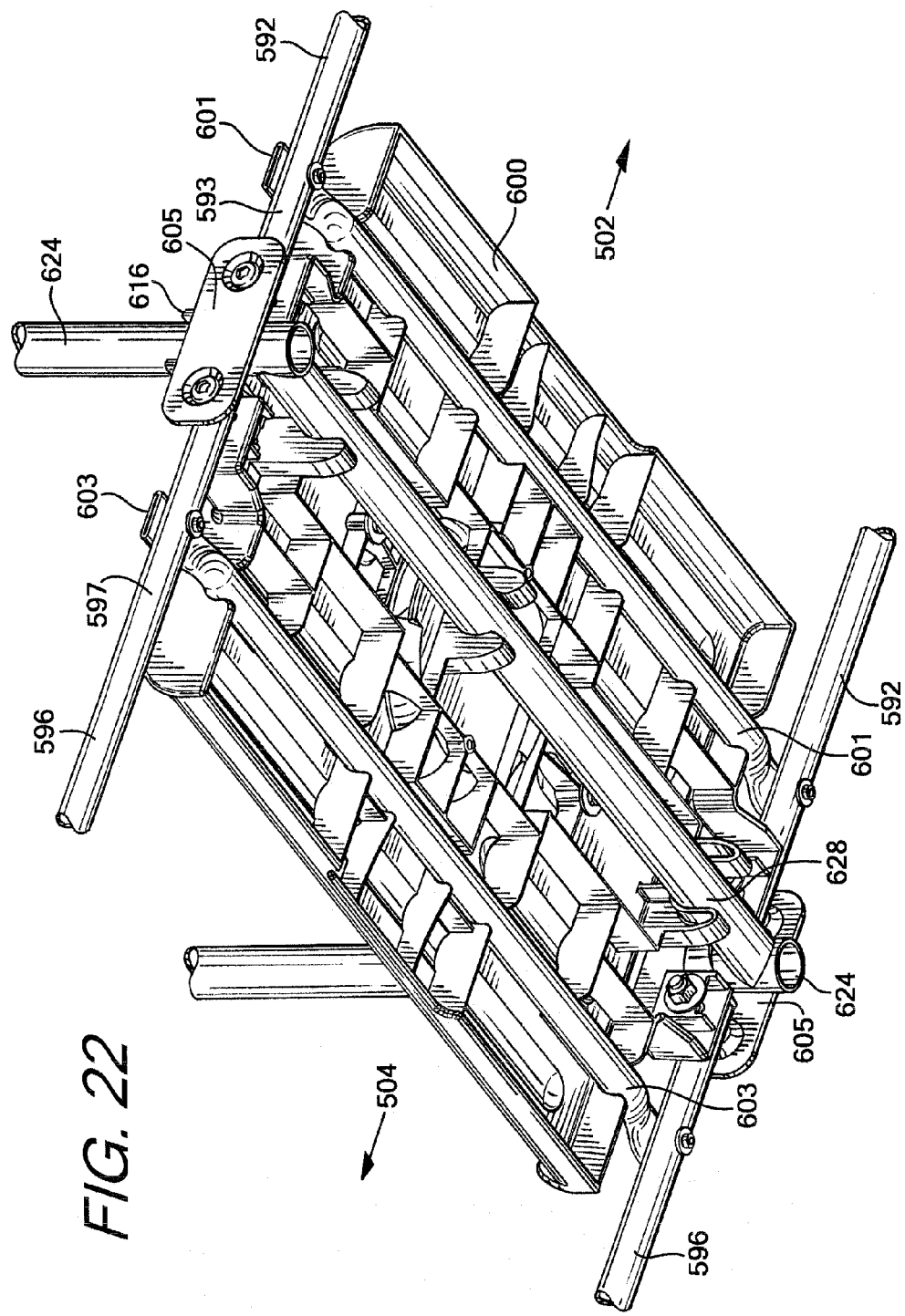
FIG. 22 is a close up perspective view of the foot rest of the housing assembly of FIG. 17.

In a preferred embodiment, the frame assembly 514 also includes a pair of laterally opposed vertical frame members 624. Each vertical frame member 624 is fixedly coupled to a respective one of the pivot brackets 518 and extends generally vertically downwardly therefrom such that one vertical frame member 624 extends downwardly from a respective pivot bracket 518 at each side of the wagon 510. As shown in FIGS. 21 and 22, a central cross member 628 extends between the vertical frame members 624 to join the two vertical frame members 624 on opposing sides of the wagon 510.

Figure 16:
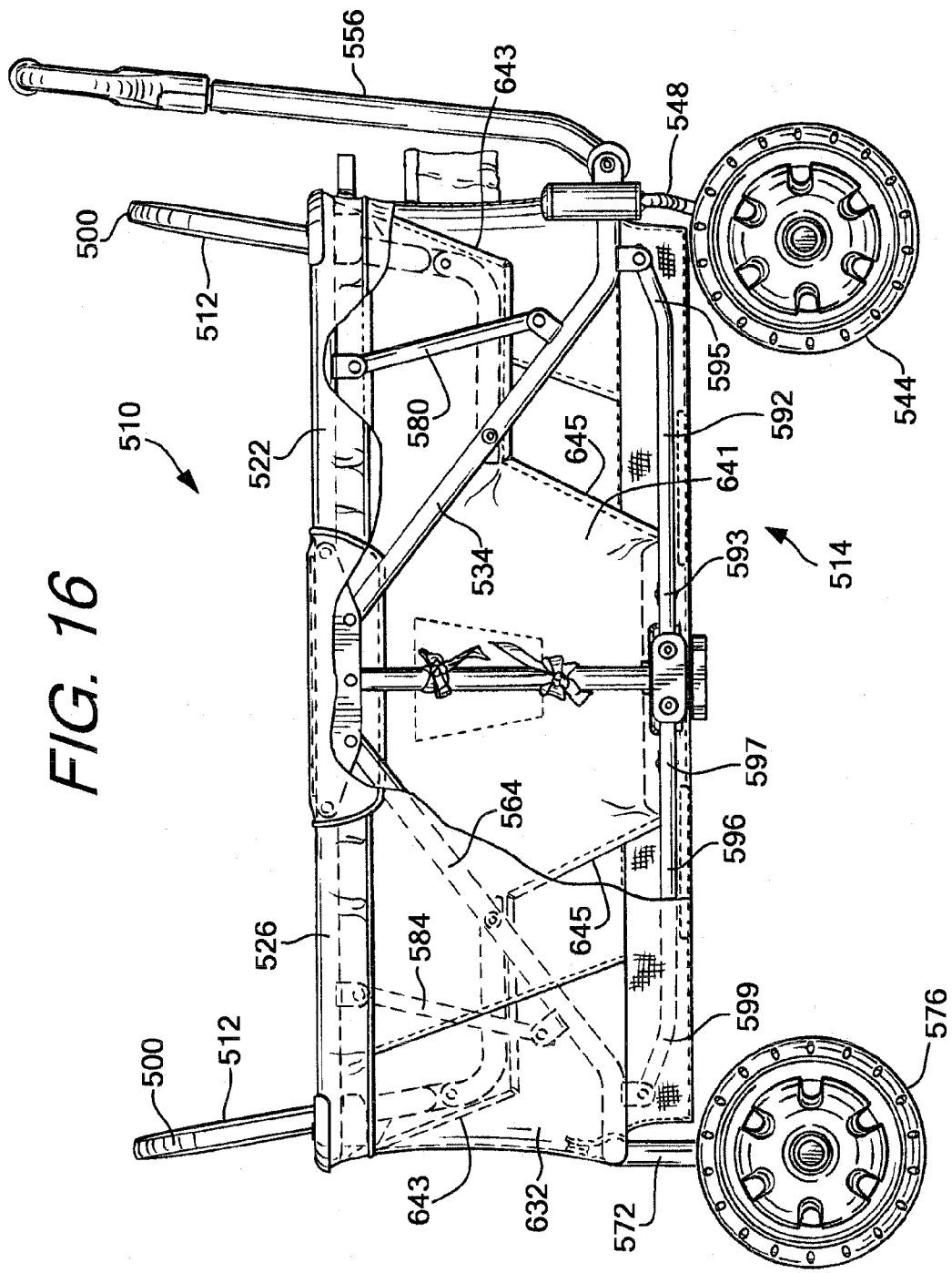
FIG. 16 is a side view of the wagon of FIG. 14 with the housing assembly partially cut away.

In one embodiment, the frame assembly 514 further comprises a pair of laterally opposed first side frame members 534. As shown in FIGS. 16 and 17, each first side frame member 534 is pivotally coupled at a proximal end to a respective one of the pivot brackets 518, and preferably extends generally forwardly and downwardly from the pivot brackets 518 toward a front portion 502 of the wagon 510. The distal end of each first side frame member 534 is preferably connected to a wheel support 536 at the front portion 502 of the frame 510. Accordingly, in a preferred embodiment one first side frame member 534 extends forwardly and downwardly from each respective pivot bracket 518 at each side of the wagon 510.

Figure 19:
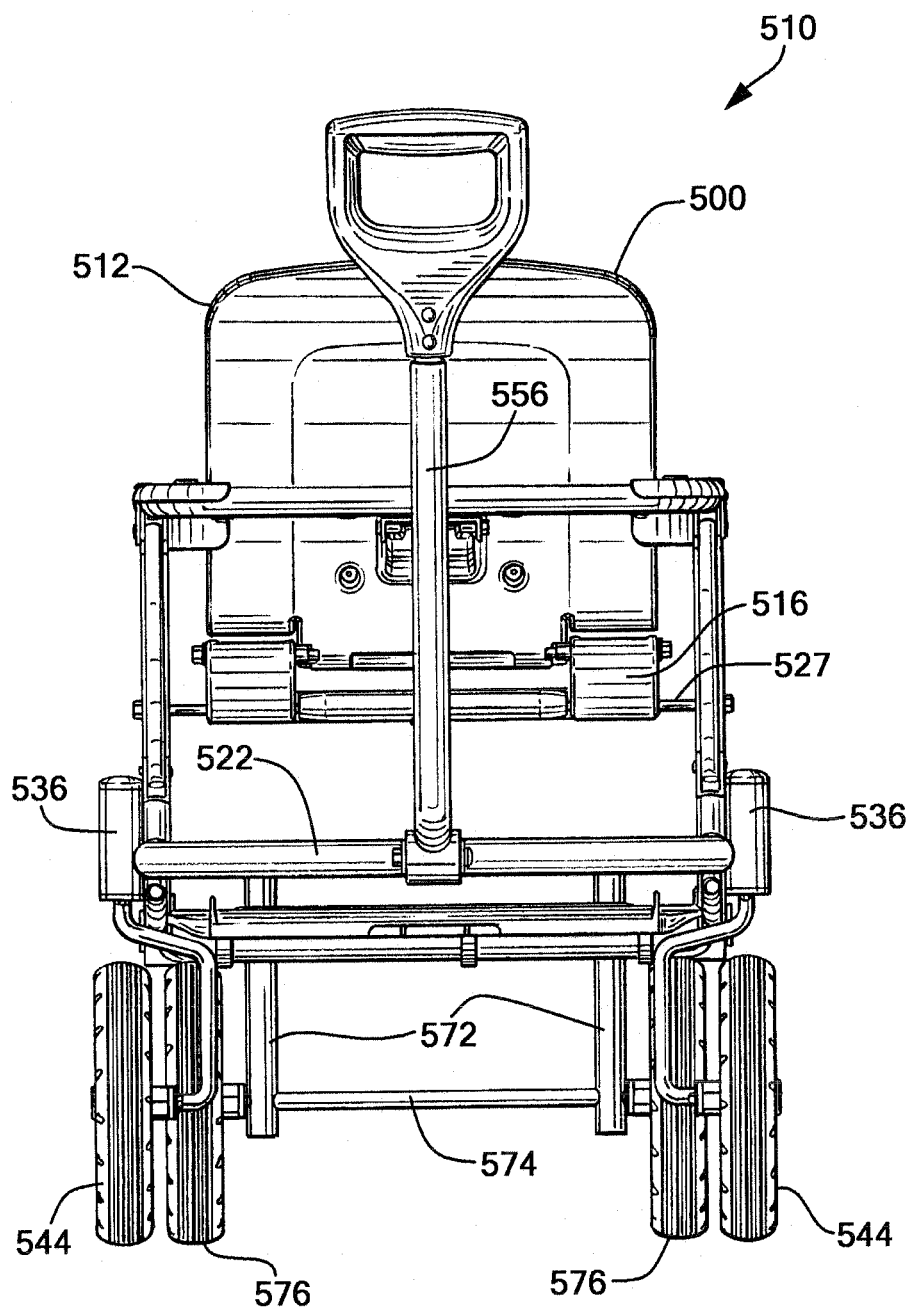
FIG. 19 is a front view of the wagon of FIG. 17.
Figure 27:
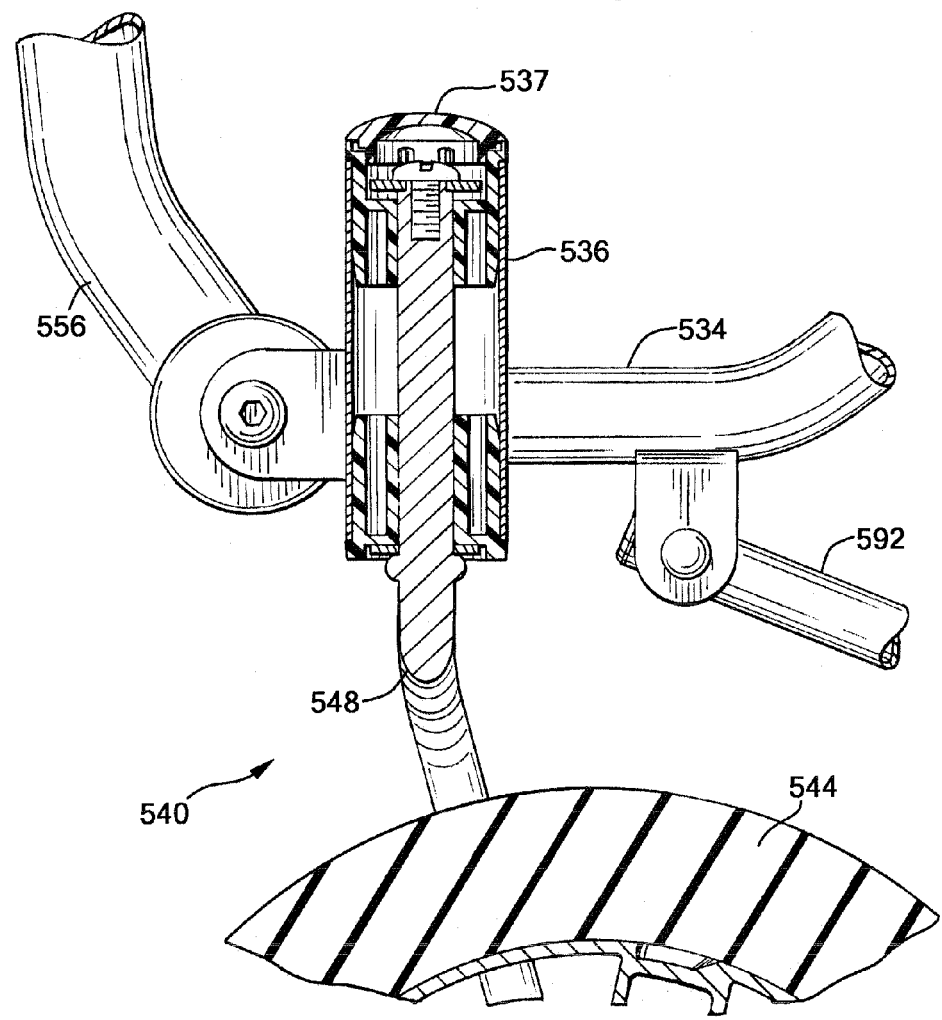
FIG. 27 is a partial cross sectional view of the front wheel support and axle assembly of the wagon of FIG. 17.

Each wheel support 536 is configured to pivotally support a front wheel assembly 540. Referring to FIGS. 17 and 27, in one embodiment, each front wheel assembly 540 comprises a front wheel 544 rotatably mounted upon an axle assembly 548, such as a caster axle assembly, that is rotatedly supported within the wheel support 536. In one embodiment, the axle assemblies 548 are configured such that the front wheels 544 operate as casters to allow for steering of the wagon 510. In a preferred embodiment, the axle assemblies 548 for the front wheels 544 are comprised of single-sided bent wire caster. The axle assembly 548 extends into the wheel support 536 and is radially supported with a bearing in the wheel support 536. An end of the axle assembly 548 is threaded to receive a bolt to retain the axle assembly 548 axially within the wheel support 536 while still allowing for rotational movement of the axle assembly 548 within the wheel support 536. A cap 537 is then placed over the bolt and on the top of the wheel support 536. As shown in FIGS. 17 and 19, a front cross member 552 extends laterally between the two wheel supports 536, and a telescoping handle 556 is pivotally coupled to the front cross member 552 of the frame assembly 514.

The frame assembly 514 also includes a pair of laterally opposed second side frame members 564. As shown in FIGS. 16 and 17, each second side frame member 564 is pivotally coupled at a proximal end to a respective one of the pivot brackets 518, and preferably extends generally rearwardly and downwardly from the pivot brackets 518 toward a rear portion 504 of the wagon 510. In one embodiment a separate cross member 568 connects the laterally opposed second side frame members 564. In an alternate embodiment, the second side frame member 564 is generally U-shaped and includes two rearwardly and downwardly extending side members 564 and a laterally extending rear cross member 568.

Figure 20:
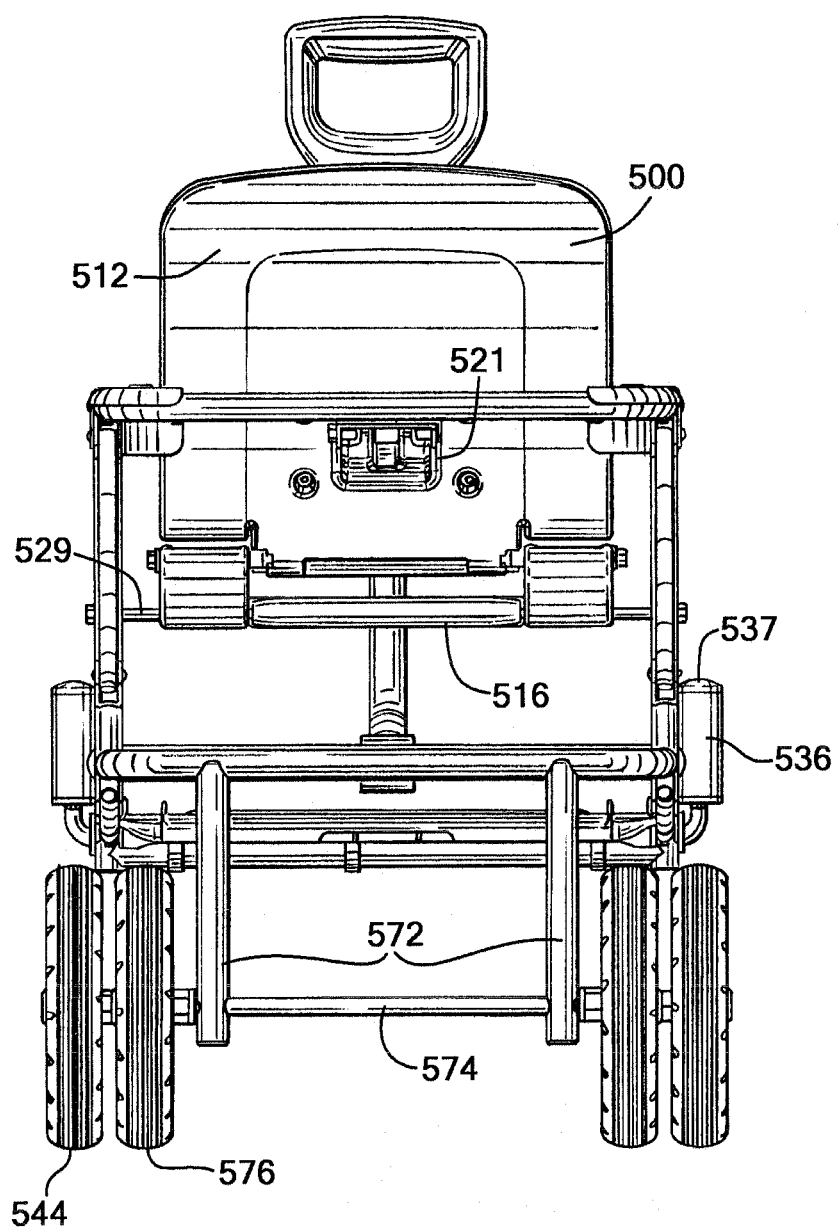
FIG. 20 is a rear view of the wagon of FIG. 17.

As shown in FIGS. 16, 17 and 20, a pair of downwardly extending rear wheel supports 572 extend downwardly from the rear cross member 568 of the second side frame member 564. A rear axle 574 extends between the rear wheel supports 572 and rotatably supports a pair of rear wheels 576. As best shown in FIGS. 19-21, the front wheels 544 are outboard of the rear wheels 576, thereby providing greater stability for the wagon 510. Additionally, because the front wheels 544 are outboard of the rear wheels 576, the rear wheels 576 can be connected to a solid rear axle 574 and still avoid the front wheels 544 during folding of the wagon 510 as shown in FIGS. 28-30.

Referring to FIGS. 16 and 17, the first upper frame member 522 and the first side frame member 534 at each side of the wagon 510 are coupled together by a first drive link 580, with one first drive link 580 being provided at each side of the wagon 510. Each first drive link 580 has one end pivotally coupled to the respective first upper frame member 522, and the opposite end pivotally coupled to the respective first side frame member 534. Similarly, the second upper frame member 526 and the second side frame member 564 are preferably coupled together by a second drive link 584, with one second drive link 584 being provided at each side of the wagon 510. Each second drive link 584 has a first end pivotally coupled to the respective second upper frame member 526, and the opposite second end pivotally coupled to the respective second side frame member 564. Each of the first and second drive links 580, 584 couple the first and second upper frame members 522, 526 to the respective first and second side frame members 534, 564, at each side of the wagon 510 thereby defining examples of four bar linkages in which the pivot brackets 518 function as the ground link of the four bar linkages. Accordingly, the first and second side frame members 534, 564 operably join the first and second upper frame members 522, 526 to the first and second lower frame members 592, 596.

As shown in FIGS. 16-17 and 21-22, the frame assembly 514 also includes a pair of first lower frame members 592 and a pair of second lower frame members 596. The first lower frame members 592 are provided at opposing sides of the front portion 502 of the wagon 510, and the second lower frame members 596 are provided at opposing sides of the rear portion 504 of the wagon 510. The first lower frame members 592 each have a proximal end 593 and a distal end 595. The proximal end 593 of each first lower frame member 592 is pivotally coupled to a respective one of the opposing sides of the footrest 600, and the distal end 595 of each first lower frame members 592 is pivotally coupled to a respective one of the opposing sides of the first side frame member 534 (see FIG. 28). Similarly, the second lower frame members 596 each have a proximal end 597 and a distal end 599. The proximal end 597 of each second lower frame member 596 is pivotally coupled to one of the opposing sides of the footrest 600, and the distal end 599 of each second lower frame member 596 is pivotally coupled to a respective one of the opposing sides of the second side frame member 564. Referring to the figures, in many instances the pivotal attachment is provided by the member having a bore at the end thereof and the opposing member having a U-shaped fastening member with holes at the end, such as a clevis, for a pin or bolt to pass, and the pin or bolt connecting the two. For example, in one embodiment the distal end of the first and second lower frame members 592, 596 has a bore and the respective coupling portion of the first and second side frame members 534, 564 has a clevis to allow for pivotal movement between the two components by connecting them with a pin or shaft.

In a preferred embodiment, as best shown in FIG. 22, a front lower cross member 601 couples the two first lower frame members 592 near the proximal ends 593 thereof, and a rear lower cross member 603 couples the two second lower frame members 596 near the proximal ends 597 thereof. Accordingly, the front lower cross member 601 and the two first lower frame members 592 form a front lower U-shaped configuration, and the rear lower cross member 603 and the two second lower frame members 596 form an opposing rear lower U-shaped configuration. Additionally, the front and the rear lower U-shaped configurations are joined and move together by both being pivotally joined to the footrest 600. As best shown in FIGS. 17, 22, 24 and 28, a bottom frame bracket 605 is provided at each side of the wagon 510 to assist in pivotally joining each of the first lower frame members 592 and each of the second lower frame members 596, respectively, to the footrest 600 with the use of four pins (two pins on each sid—one to pivotally join the first lower frame member 592 to the footrest 600 and one to pivotally join the second lower frame member 596 to the footrest 600). As shown in FIG. 22, one bottom frame bracket 605 is provided on the outside of each vertical frame member 624, and each bottom frame bracket 605 is joined to the respective side of the footrest 600 with two bolts, one bolt to allow for pivoting movement of the first lower frame member 592 and one bolt to allow for pivoting movement of the second lower frame member 596.

As explained above and shown in FIGS. 21 and 22, the central cross member 628 extends between the vertical frame members 624 to join the two vertical frame members 624 on opposing sides of the wagon 510. The central cross member 628 and the two vertical frame members 624 do not pivot or move and stay in the same orientation in both the unfolded configuration and the folded configuration of the foldable wagon 510.

The footrest 600 of this embodiment of the wagon 510 is secured to the collapsible frame 514 and is used to both support the feet of one or more passengers in the wagon 510, as well as to initiate and continue folding of the wagon 510 to transition the wagon 510 from the open, unfolded or use configuration, to the collapsed or folded configuration. As shown in FIG. 16, the footrest 600 defines the lowermost portion of the housing 632 of the wagon. In a preferred embodiment the footrest 600 is a plastic component, such as an injection molded component, however, any generally rigid material would be acceptable. As shown in FIGS. 17, 21, 22, 24 and 28, the footrest 600 has a guide 616 at each side of the footrest 600 to allow the footrest 600 to slidingly mate with the two opposing vertical frame members 624 to allow the footrest 600 can slide up and down on the two opposing vertical frame members 624 (see FIG. 24) during folding and unfolding of the wagon 510. In one embodiment the guide 616 is substantially C-shaped.

Figure 23:
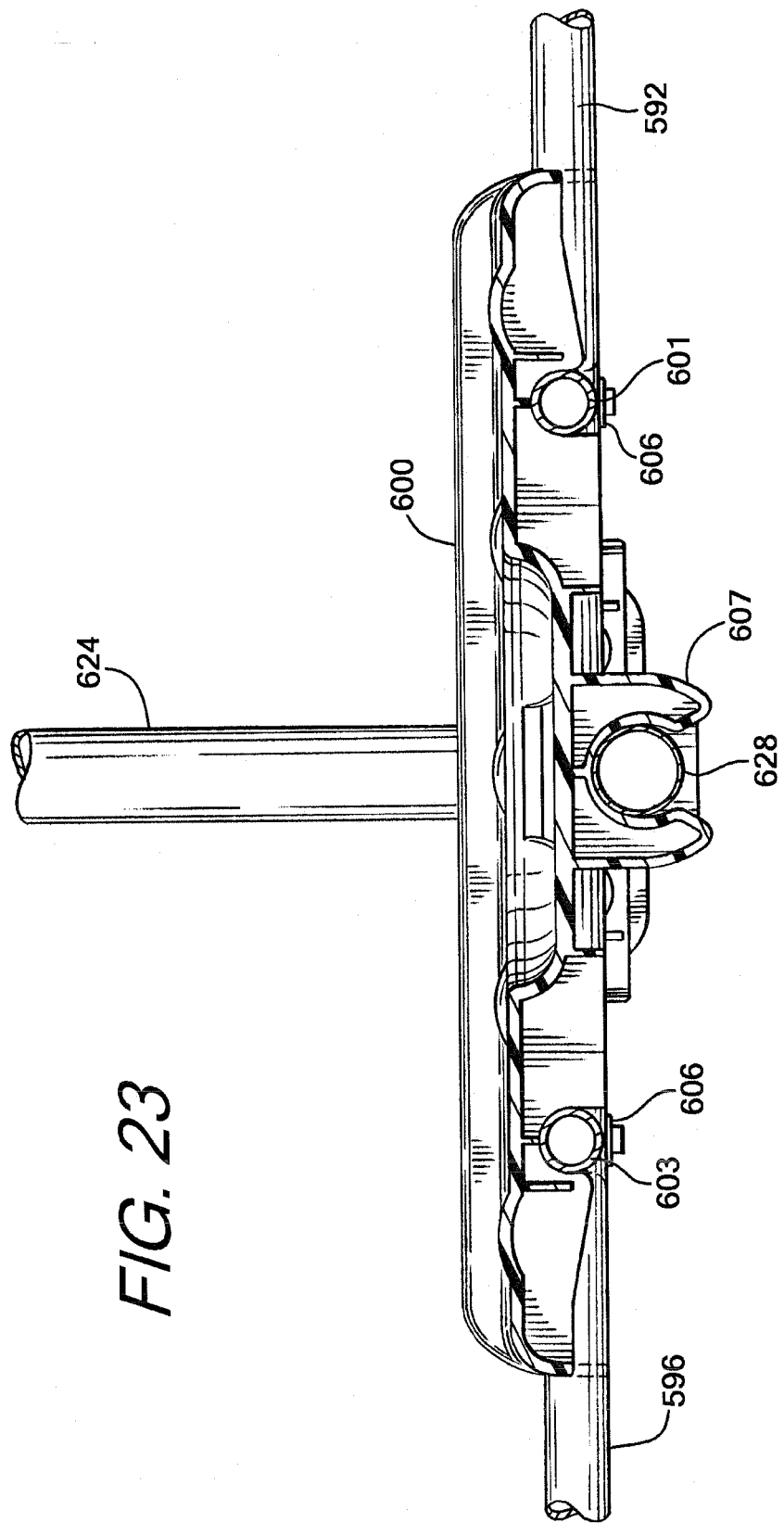
FIG. 23 is a partial cross-sectional side view of the foot rest of FIG. 22 in the use position.
Figure 24:
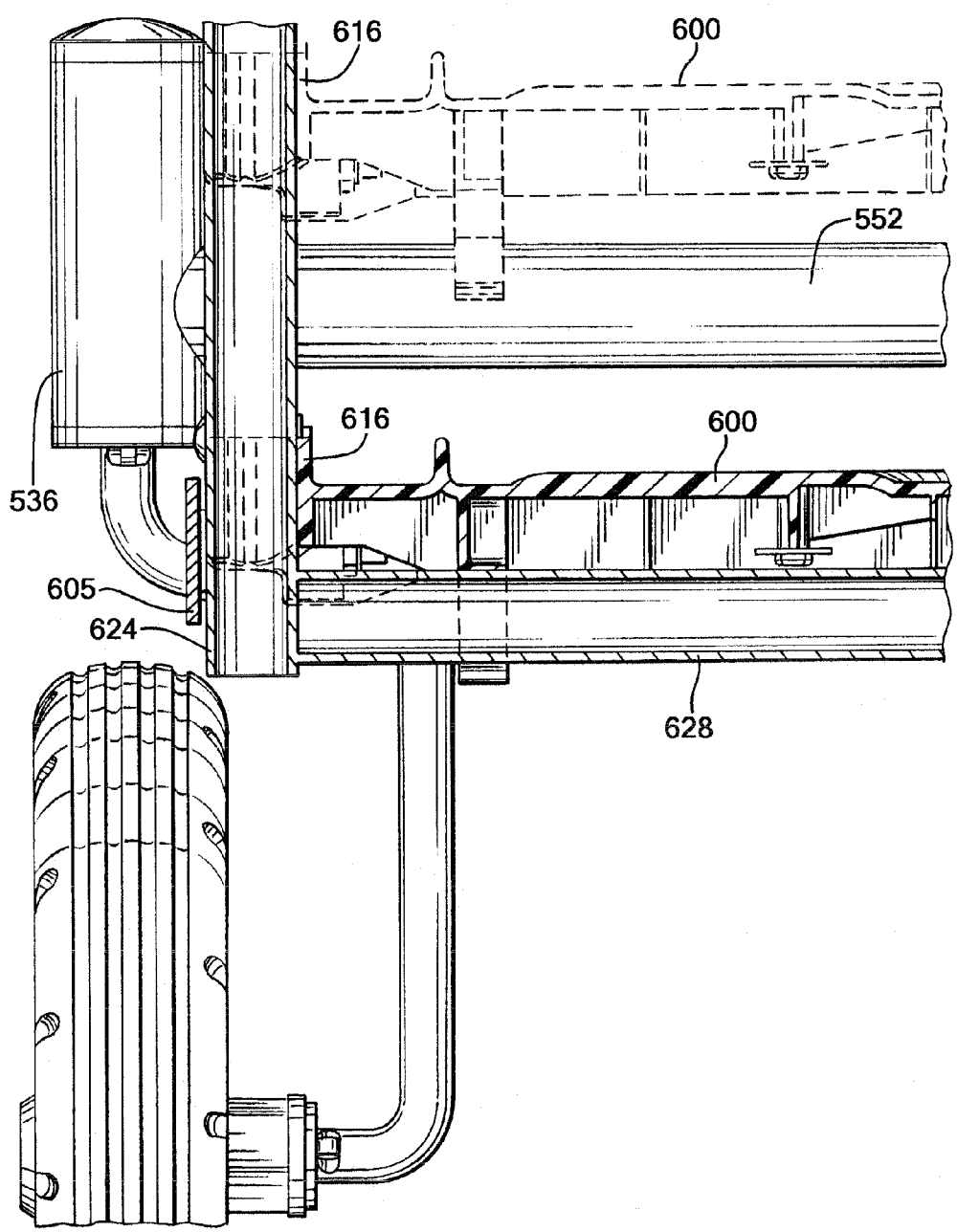
FIG. 24 is a partial cross-sectional end view of the foot rest of FIG. 22 in the use position and in phantom in a closing position.
Figure 25:
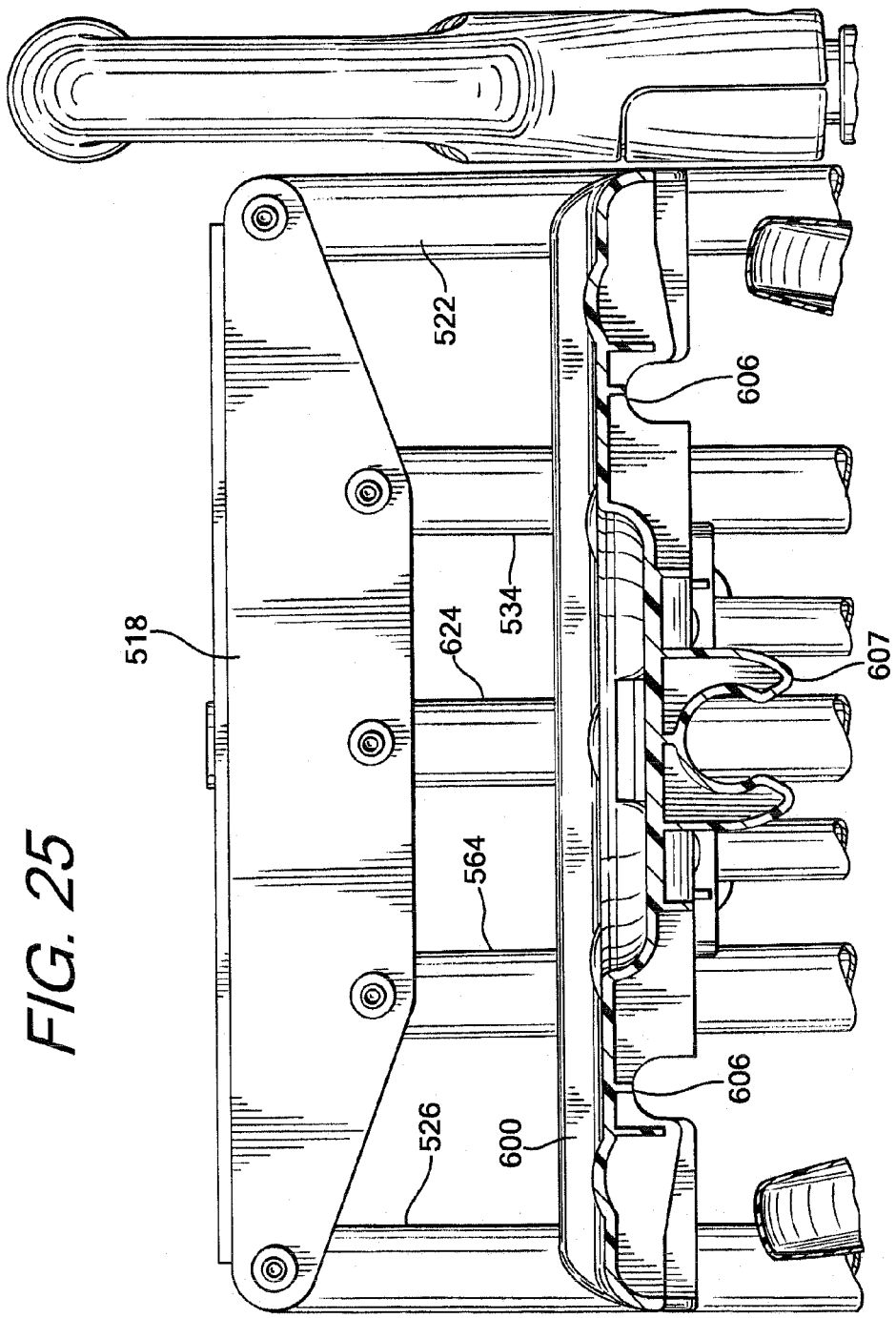
FIG. 25 is a partial cross-sectional side view of the foot rest of FIG. 22 in the closed position.

As best shown in FIGS. 22-25, the bottom of the footrest 600 has two receivers 606 to receive the front lower cross member 601 and the rear lower cross member 603 when the wagon 510 is in the unfolded configuration (See FIGS. 23 and 25). The receivers 606 are used to locate the footrest 600 on the lower cross members 601, 603. Further, as shown in FIG. 22 the footrest 600 has a central clamp member 607 that engages the central cross member 628 to retain the footrest 600 in the lower position until a sufficient force is applied to lift the footrest 600 and disengage the central clamp member 607 from the central cross member 628. In one embodiment, a force of at least 10 lbs. is required to disengage the central clamp member 607 from the central cross member 628. In that manner the footrest 600 should not become unintentionally disengaged from the central cross member 628 and the wagon 510 will remain in the opened configuration unless intentionally manipulated to set it in motion to convert to the folded configuration. The footrest 600 has two additional guides 609, 611 that engage the central cross member 628 to properly locate and seat the footrest 600 on the central cross member 628, however, in a preferred embodiment the additional guides 609, 611 do not clamp to the central cross member 628, but preferably just sit on the central cross member 628.

Figure 26:
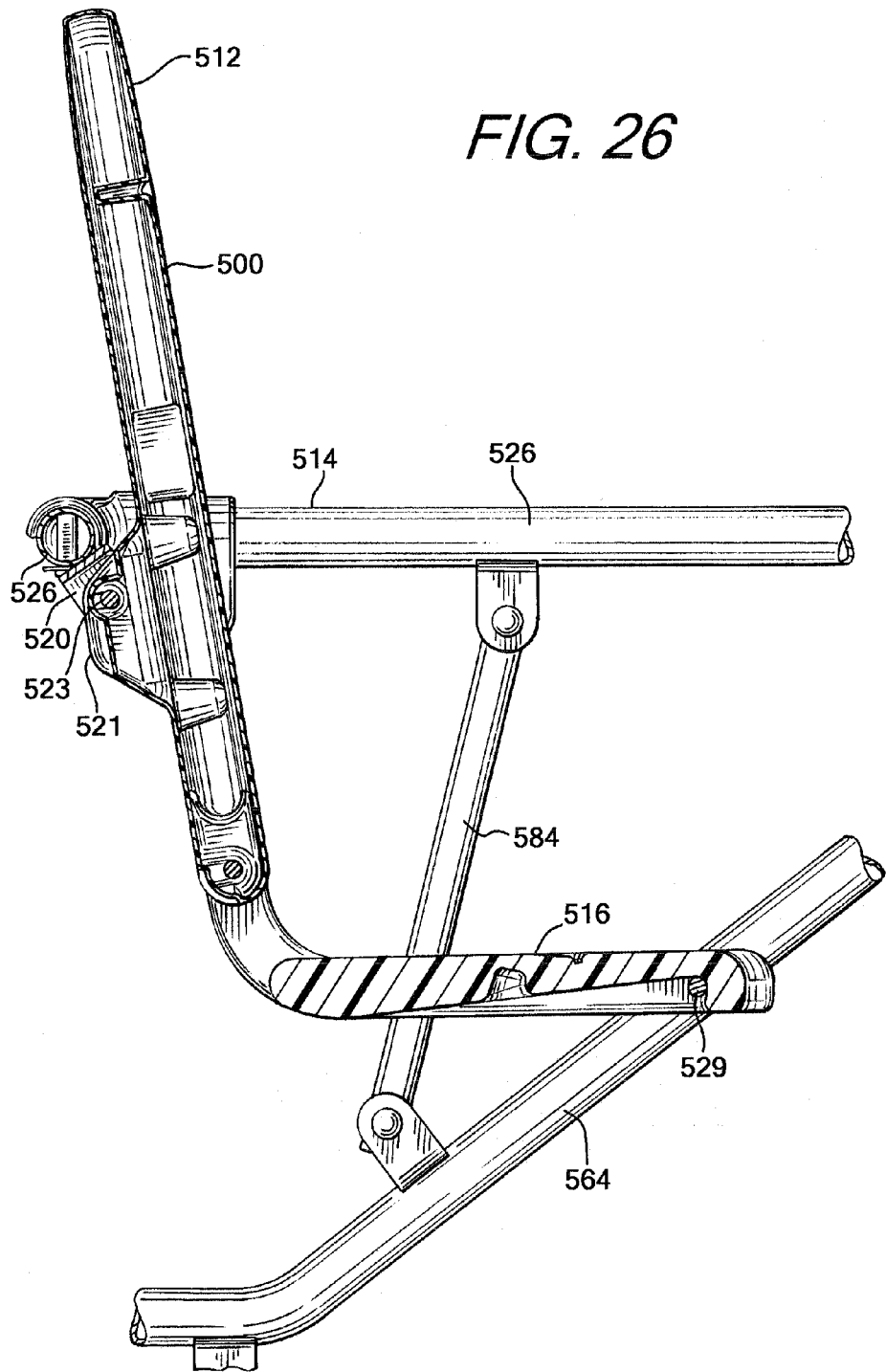
FIG. 26 is a partial cross-sectional side view of the chair of the wagon of FIG. 17.

In one embodiment the folding wagon 510 has a seat 500, and in a preferred embodiment it has a plurality of seats 500. Additionally, in a preferred embodiment the seat 500 is a substantially rigid member, and most preferably the seat 500 is made of plastic. Further, most preferably the wagon 510 has a first seat 500 at a front portion 502 of the wagon and a second seat 500 at a rear portion 504 of the wagon. In one embodiment, as shown in FIG. 16, a top of the seat back portion 512 is located above the upper perimeter of the collapsible frame 514 when the collapsible frame 514 is positioned in the open position. In a preferred embodiment, the first seat 500 and the second seat 500 are identical. The seats 500 preferably have a seat back portion 512 and a seat bottom portion 516. In such an embodiment the seat bottom 516 is hingedly connected to the seat back 512 as shown in FIGS. 16, 17 and 26. The seat back 512 is also pivotally connected to the collapsible frame assembly 514. Referring to FIG. 26, the first and second upper frame members 522, 526 have a clevis 520 extending therefrom, and the backside of each seat back 512 has a bump 521 that can fit within the clevis 520. The clevis 520 has a pair of bores and the bump 521 similarly has a central bore, such that a shaft 523 can pivotally connect seat backs 512 to each respective upper frame member 522, 526.

As best shown in FIGS. 21 and 26, a first shaft 527 connects the laterally opposed first side frame members 534, and a second shaft 529 connects the laterally opposed second side frame members 564. The seat bottom 516 at the front portion 502 of the wagon 510 is pivotally coupled to the first shaft 527, and the seat bottom 516 at the rear portion 504 of the wagon 510 is pivotally coupled to the second shaft 529. In one embodiment the first and second shafts 527, 529, respective, pass through a bore in the seat bottom 516 to rotately secure the seat bottom 516 to the collapsible wagon frame assembly 514. As shown in FIG. 16, the seat bottom 516 is distinct from the footrest 600.

Figure 14:
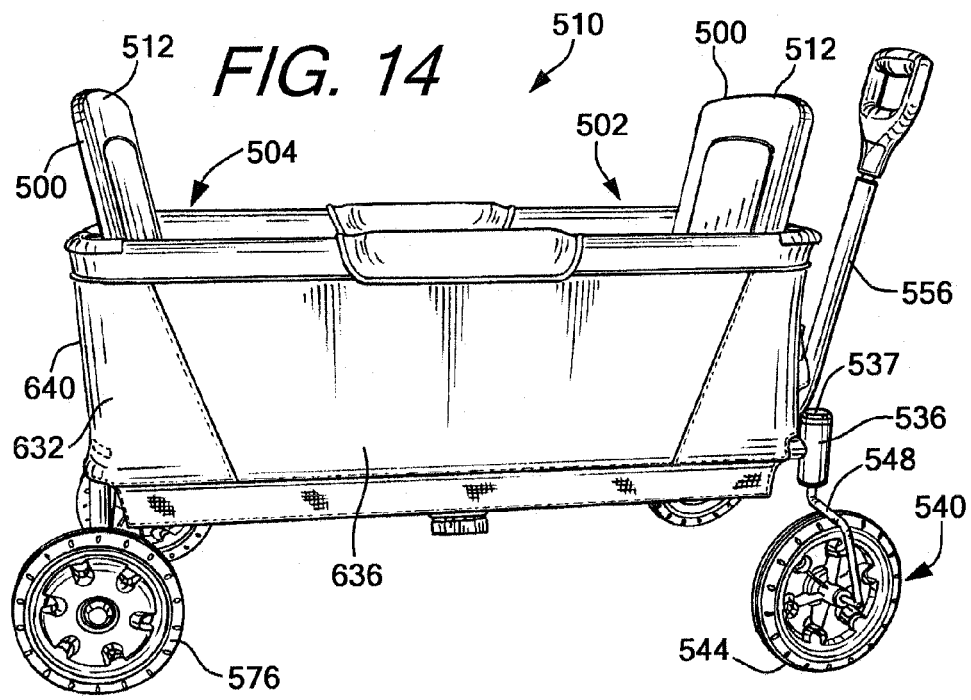
FIG. 14 is a side perspective view of a folding wagon according to another embodiment.
Figure 15:
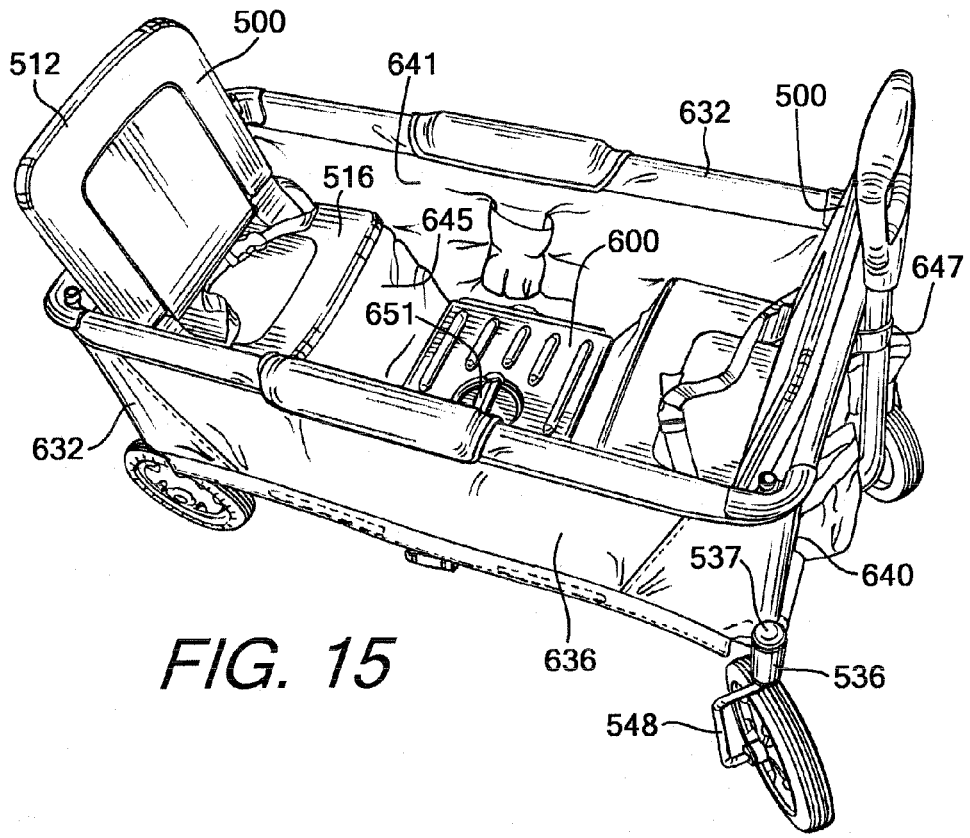
FIG. 15 is a top perspective view of the folding wagon of FIG. 14.
Figure 31:
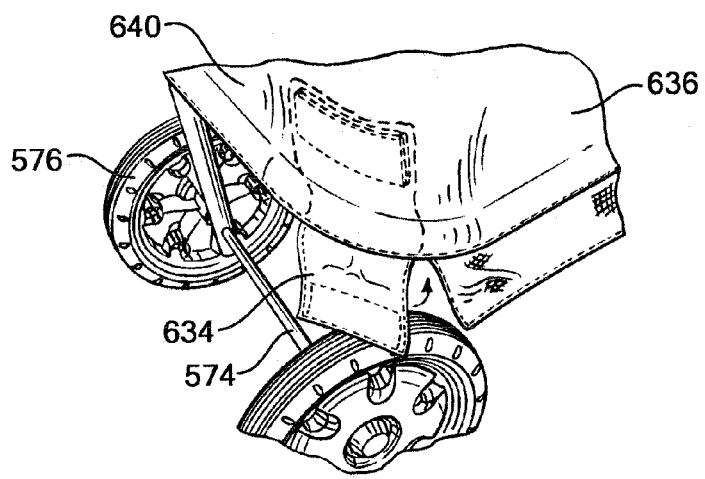
FIG. 31 is a partial perspective view of the housing enclosure of the wagon of FIG. 14.
Figure 32:
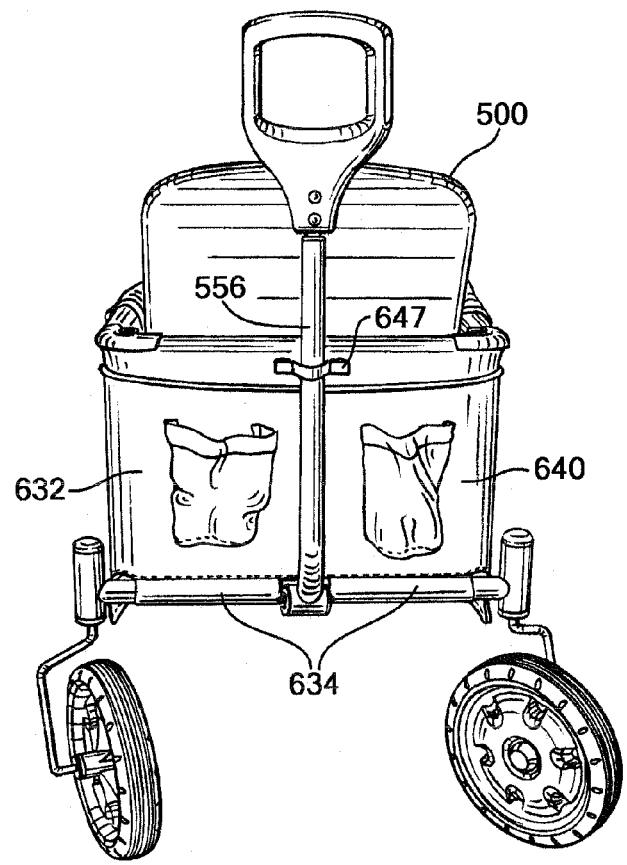
FIG. 32 is a front view of the wagon of FIG. 14.

In one embodiment, the wagon 510 also includes a housing assembly 632 that defines sidewalls of the wagon 510. In a preferred embodiment, the housing assembly 632 is at least partially made of fabric and is referred to as the fabric assembly 632. In an alternate embodiment the housing assembly 632 may also define a portion of the interior cavity of the wagon 510. As such, the housing assembly 632 may be provided as an interior wall portion and an exterior wall portion of the wagon 510. Referring to FIGS. 14-16, the housing assembly 532 includes exterior side portions 636 and end portions 640. The housing assembly 632 has extensions exterior 634 that are used to secure the housing assembly 632 to the wagon 510. As shown in FIG. 31, in one embodiment the housing assembly 632 has exterior extensions 634 at both the front and rear end portions as well as the sides of the wagon 510. In a preferred embodiment, the extensions have a fastener, such as Velcro, to attach to a mating fastener to secure the housing assembly 632 around the wagon 510. As shown in FIG. 15, the housing assembly 632 further defines an interior cavity of the wagon 510. In one embodiment the housing assembly 632 includes interior sidewall portions 641, interior endwall portions 643 and interior footwell portions 645 to provide a housing 632 between the seat 500 and the footrest 600. Alternately, the interior of the housing assembly 632 may extend about the entire cavity of the wagon 510, including under the footrest 600, behind the seat back portion 512 and under the seat bottom portion 516. In such an embodiment apertures are provided in the flexible housing assembly 532 to allow for the various shafts, etc. to extend through to the frame assembly 514. Additionally, as shown in FIGS. 15 and 32, the housing 632 includes integral cup holders on the exterior of the housing 632 as well as in the interior of the housing 632. The housing 632 may also include a strap 647 (see FIG. 32) or other retaining member to secure the telescoping handle 556 in the upright position for transportation, especially in the collapsed or folded configuration.

With reference to FIGS. 15, 24 and 28-30, to fold the wagon 510 only one hand is needed. A handle or strap 651 is coupled to the footrest 600. The strap 651 can be grasped and lifted upwardly toward the upper frame members 522, 526. As explained above, in one embodiment the footrest 600 is secured to the central cross member 628 with a central clamp member 607. To disengage the central clamp member 607 from the central cross member 628 a certain force must be provided, which in one embodiment is approximately 10 lbs. As the footrest 600 is lifted, the guides 616 slide upwardly along the vertical frame members 624 (See FIG. 24). Since the first and second lower frame members 592, 596 are pivotally connected to the foot rest 600, as the footrest 600 is raised the proximal ends 597 of the first and second lower frame members 592, 596 also begin to raise with the footrest 600 and the distal end 599 of the first and second lower frame members 592, 596 accordingly pivot toward the vertical frame members 624 in the center of the wagon 510 (see FIGS. 28 and 29). Also, as the footrest 600 is lifted and the distal ends 599 of the first and second lower frame members 592, 596 pivot inwardly and downwardly, the first and second side frame members 534, 564 similarly pivot about the respective pivot brackets 518 such that the distal ends of the first and second side frame members 534, 564 are pivoted inwardly and downwardly toward the vertical frame member 624. The first and second drive links 580, 584 being pivotally connected to the first and second side frame members 534, 564, respectively, further pivot the first and second upper frame members 522, 526 about the respective pivot brackets 518, to also pivot the distal ends of the first and second upper frame members 522, 526 inwardly and downwardly toward the vertical frame member 624. Further, as the wagon 510 is folded, the front wheels 544 move backwards and toward a center of the wagon 510. This movement causes the front caster 548 to rotate, thereby providing clearance for nesting of the rear wheels 576 in the folded configuration. It is also understood that, in the preferred embodiment, because the front axle assembly 548 is a single-sided bent wire caster, gravity will similarly cause the front axle assembly 548 to rotate to the appropriate position due to the weight of the front wheel 544.

When the footrest 600 has been moved to a location between, but possibly somewhat lower than the pivot brackets 518 (see FIG. 25) the wagon 510 is generally in the fully folded configuration of FIGS. 28 and 29. To lock the wagon 510 in the folded configuration an over-center locking mechanism is employed with both the first and second upper frame members 522, 526. Referring to FIG. 29, with respect to the second upper frame member 526, a centerline has been inserted in FIG. 29 between (a) the pivot joint joining the pivot bracket 518 and the second upper frame member 526, and (b) the pivot joint joining the second end of the second drive link 584 to the second side frame member 564. When the pivot joint joining the first end of the second drive link 584 to the second upper frame member 526 is moved past that imaginary centerline, i.e., it is thereby passed over the centerline, or over center, and operates to lock the second upper frame member 526 in place until a sufficient force is applied to move the second upper frame member 526 back to past the center line to unlock the second upper frame member 526. A similar over-center locking mechanism is provided for the first upper frame member 522. Finally, the telescoping handle 556 may be reduced in length before or after the wagon 510 is folded. As shown in FIG. 30, the wagon 510 may be carted about its rear wheels 576 in the folded configuration, similar to a piece of luggage.

To unfold the wagon 510, a user may grasp the first and second upper frame members 522, 526 and pull them away from the center (i.e., apart from one another), which tends to unlock the over-center locking mechanism on each upper frame member 522, 526 and will further extend the wagon 510 in the longitudinal direction, causing the footrest 600 to move downwardly along the vertical frame members 624. To place the wagon 510 is the fully unfolded configuration, the user will push down on the footrest 600, causing the central clamp member 607 of the footrest 600 to be secured to the central cross member 628 of the collapsible frame 514.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second,"

"third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

What is claimed is:

1. A foldable wagon, comprising:
   a collapsible frame having a pivotable first upper frame member and a pivotable second upper frame member, the first and second pivotable upper frame members defining an upper perimeter of the frame, the collapsible frame being positionable in an open position and in a collapsed position, the pivotable first upper frame member located at a front portion of the wagon in the open position and the pivotable second upper frame member located at a rear portion of the wagon in the open position;
   a pivot bracket connecting the first upper frame member and the second upper frame member;
   a first side frame member pivotally connected at one end to the pivot bracket and at another end coupled to a first lower frame member, and a second side frame member pivotally connected at one end to the pivot bracket and at another end coupled to a second lower frame member, the first side frame member joining the first upper frame member to the first lower frame member, and the second side frame member joining the second upper frame member to the second lower frame member;
   a handle operably coupled at the front portion of the collapsible frame;
   at least one front wheel and at least one rear wheel operably coupled to the collapsible frame; and,
   a seat having a seat back and a seat bottom that are substantially rigid members, wherein the seat back is pivotally coupled to the first upper frame member of the collapsible frame and wherein the seat bottom is hingedly coupled directly to the seat back, and wherein the seat bottom is distinct from a bottom of the wagon.

2. The foldable wagon of claim 1, further comprising a foot rest secured to the collapsible frame at a position lower than the seat bottom when the collapsible frame is in the open position.

3. The foldable wagon of claim 2, further comprising a first lower frame member and a second lower frame member, the first and second lower frame members being operatively pivotally coupled to the foot rest, the foot rest being slidable coupled to the collapsible frame to move vertically to collapse the collapsible frame.

4. The foldable wagon of claim 1, further comprising a flexible housing secured about a perimeter of the foldable wagon.

5. The foldable wagon of claim 4, wherein the seat is a made of a substantially rigid plastic and wherein the flexible housing is made of fabric.

6. The foldable wagon of claim 1, wherein the first upper frame member is pivotally coupled to the pivot bracket and the second upper frame member is pivotally coupled to the pivot bracket.

7. The foldable wagon of claim 1, wherein the seat back and the seat bottom are substantially rigid members.

8. The foldable wagon of claim 1, wherein the seat back is pivotally coupled to the first upper frame member, and a second seat back pivotally coupled to the second upper frame member and a second seat bottom directly hingedly coupled to the second seat back.

9. The foldable wagon of claim 1, wherein the seat back is a separate component from the collapsible frame and wherein a top of the seat back is above the upper perimeter of the collapsible frame when the collapsible frame is positioned in the open position.

10. The foldable wagon of claim 1, wherein the seat back has a first end and a second end, wherein the seat back is pivotally coupled to the collapsible frame between the first end and the second end of the seat back, wherein the seat bottom has a first end and a second end, wherein the first end of the seat bottom is hingedly coupled to the seat back, and wherein the second end of the seat bottom is pivotally coupled to the collapsible frame.

11. A foldable wagon, comprising:
    a collapsible frame positionable in an open position and a collapsed position, the collapsible frame having a first upper frame member pivotally coupled to a pivot bracket to form a front portion of the wagon, a second upper frame member pivotally coupled to the pivot bracket to form a rear portion of the wagon, and a vertical frame member coupled to the pivot bracket;
    a first side frame member pivotally connected at one end to the pivot bracket and at another end coupled to a first lower frame member, and a second side frame member pivotally connected at one end to the pivot bracket and at another end coupled to a second lower frame member, the first side frame member joining the first upper frame member to the first lower frame member, and the second side frame member joining the second upper frame member to the second lower frame member;
    a first seat pivotally coupled to the collapsible frame and a second seat pivotally coupled to the collapsible frame, the first seat having a first seat back and a first seat bottom hingedly coupled to the first seat back, and the second seat having a second seat back and a second seat bottom hingedly coupled to the second seat back; and,
    a foot rest extending from one side of the frame to an opposing side of the frame, the foot rest being slideably coupled to the vertical frame member of the collapsible frame and moveable from a bottom of the wagon toward the pivot bracket to transition the collapsible frame to the collapsed position.

12. The foldable wagon of claim 11, wherein the foot rest is in a parallel plane in the open position and the collapsed position.

13. The foldable wagon of claim 11, further comprising:
    the first and second lower frame members operably pivotally coupled at their proximal ends to the foot rest to transition with the foot rest;
    and,
    a first link member pivotally coupled at one end to the first upper frame member and at another end pivotally coupled to the first side frame member, and a second link member pivotally coupled at one end to the second upper frame member and at another end pivotally coupled to the second side frame member.

14. The foldable wagon of claim 13, wherein the first seat bottom is also pivotally coupled to the first side frame member, and wherein the second seat bottom is also pivotally coupled to the second side frame member.

15. A foldable wagon, comprising:
   a collapsible frame positionable in an open position and a collapsed position, the collapsible frame comprising an upper frame member, a lower frame member and a side frame member between the upper frame member and the lower frame member;
   a pivot bracket, the upper frame member and the side frame member being directly connected to the pivot bracket;
   a seat having a seat back and a seat bottom, the seat back being pivotally coupled to the upper frame member, the seat bottom being pivotally coupled to the side frame member, and the seat back being directly hingedly coupled to the seat bottom;
   a plurality of wheels coupled to the collapsible frame; and,
   a flexible housing about the collapsible frame to form a sidewall for the wagon.

16. The foldable wagon of claim 15, further comprising a foot rest slideably coupled to the frame, the foot rest moveable vertically upwardly toward the upper frame member, and the foot rest being located in a parallel plane in the open position and the collapsed position.

17. A foldable wagon, comprising:
   a collapsible frame positionable in an open position and a collapsed position;
   a plurality of wheels coupled to the collapsible frame;
   a handle coupled to the collapsible frame; and,
   wherein the collapsible frame comprises an upper frame member, a lower frame member, a side frame member between the upper frame member and the lower frame member, and a link member pivotally connected at one end to the upper frame member and at another end to the side frame member, the collapsible frame being locked in the collapsed position when a pivot joining the link member to the upper frame member goes over center of a centerline to lock the upper frame member.

18. The foldable wagon of claim 17, further comprising a plurality of substantially rigid seats pivotally coupled to the collapsible frame, the substantially rigid seats each having a substantially rigid seat back and a substantially rigid seat bottom hingedly coupled to the seat back, and a flexible housing around the collapsible frame to form a sidewall for the wagon.

19. A method for folding a collapsible wagon, comprising the steps of:
   providing a collapsible frame having a first upper frame member and a second upper frame member pivotally coupled to a pivot bracket, a seat pivotally coupled to a cross member of the first upper frame member of the collapsible frame, the seat having a seat back and a seat bottom directly pivotally coupled to the seat back, a foot rest adjacent a bottom of the collapsible frame, and first and second lower frame members operatively pivotally coupled to the foot rest at proximal ends thereof; and,
   lifting the foot rest toward the pivot bracket, the proximal ends of the first and second lower frame members raising with the foot rest and the cross member of the first upper frame member where the seat is pivotally connected thereto dropping downward and inwardly toward a distal end of the first lower frame member.

20. The method of claim 19, further comprising the steps of:
   providing a first link member pivotally coupled at a first end to the first upper frame member and at a second end operatively pivotally coupled to the first lower frame member, and a second link member pivotally coupled at a first end to the second upper frame member and at a second end operatively pivotally coupled to the second lower frame member; and,
   pushing a distal end of first upper frame member inwardly such that the pivot connection of the first upper frame member to the first link member is inward of a centerline of two other pivot points, thereby locking the first upper frame member in an over the center locking position, and pushing a distal end of the second upper frame member inwardly such that the pivot connection of the second upper frame member to the second link member is inward of a centerline of two other pivot points, thereby locking the second upper frame member in an over the center locking position.

\* \* \* \* \*